(12) United States Patent
Ben Shalom

(10) Patent No.: US 11,155,249 B2
(45) Date of Patent: *Oct. 26, 2021

(54) SYSTEMS AND METHODS FOR CAUSING A VEHICLE RESPONSE BASED ON TRAFFIC LIGHT DETECTION

(71) Applicant: MOBILEYE VISION TECHNOLOGIES LTD., Jerusalem (IL)

(72) Inventor: Itai Ben Shalom, Mazkaret Batya (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,853

(22) Filed: Dec. 10, 2019

(65) Prior Publication Data

US 2020/0108806 A1 Apr. 9, 2020

Related U.S. Application Data

(63) Continuation of application No. 15/194,921, filed on Jun. 28, 2016, now Pat. No. 10,507,807.

(Continued)

(51) Int. Cl.
*G06F 7/70* (2006.01)
*B60T 7/12* (2006.01)
(Continued)

(52) U.S. Cl.
CPC ............ *B60T 7/12* (2013.01); *B60K 31/0008* (2013.01); *B60Q 9/00* (2013.01); *B60T 7/18* (2013.01);
(Continued)

(58) Field of Classification Search
CPC ....... B60W 30/18154; B60W 2555/60; B60W 2420/42; B60W 2540/18;
(Continued)

(56) References Cited

U.S. PATENT DOCUMENTS 9,558,660 B1 * 1/2017 Fowe .................... G08G 1/0133
2011/0210867 A1 * 9/2011 Benedikt .......... G08G 1/096716
340/905

(Continued)

OTHER PUBLICATIONS

"Autonomous including driverless vehicles," Ministry of Transport of New Zealand, available on the Internet at URL: http://www.transport.govt.nz/ourwork/technology/specific-transport-technologies/road-vehicle/autonomous-vehicles/, retrieved on Jun. 27, 2016 (4 pages).

*Primary Examiner* — Adam M Alharbi
(74) *Attorney, Agent, or Firm* — Finnegan, Henderson, Farabow, Garrett & Dunner, LLP

(57) ABSTRACT

A traffic light detection system for a vehicle is provided. The system may include at least one processing device programmed to receive, from at least one image capture device, a plurality of images representative of an area forward of the vehicle, the area including a traffic light fixture having at least one traffic light. The at least one processing device may also be programmed to analyze at least one of the plurality of images to determine a status of the at least one traffic light, and determine an estimated amount of time until the vehicle will reach an intersection associated with the traffic light fixture. The at least one processing device may further be programmed to cause a system response based on the status of at least one traffic light and the estimated amount of time until the vehicle will reach the intersection.

20 Claims, 26 Drawing Sheets

Related U.S. Application Data

(60) Provisional application No. 62/153,553, filed on Apr. 28, 2015.

(51) Int. Cl.
*B60Q 9/00* (2006.01)
*B60K 31/00* (2006.01)
*B60W 30/18* (2012.01)
*B60T 7/22* (2006.01)
*B60T 7/18* (2006.01)

(52) U.S. Cl.
CPC ......... *B60T 7/22* (2013.01); *B60W 30/18109* (2013.01); *B60W 30/18154* (2013.01); *B60K 2031/0025* (2013.01); *B60T 2201/022* (2013.01); *B60T 2210/32* (2013.01); *B60T 2210/36* (2013.01); *B60W 2420/42* (2013.01); *B60W 2540/18* (2013.01); *B60W 2555/60* (2020.02)

(58) Field of Classification Search
CPC ....... B60K 2031/0025; B60T 2201/022; B60T 2210/32; B60T 2210/36
See application file for complete search history.

(56) References Cited

U.S. PATENT DOCUMENTS

| | | | |
|---|---|---|---|
| 2012/0249343 A1* | 10/2012 | Thomas | G08G 1/096783 340/905 |
| 2013/0297124 A1* | 11/2013 | Be | G06F 17/00 701/22 |
| 2015/0210274 A1* | 7/2015 | Clarke | G08G 1/167 382/104 |
| 2019/0389465 A1* | 12/2019 | Ogino | B60W 30/09 |
| 2020/0047771 A1* | 2/2020 | Yoon | B60W 60/001 |

* cited by examiner

SYSTEMS AND METHODS FOR CAUSING A VEHICLE RESPONSE BASED ON TRAFFIC LIGHT DETECTION

CROSS REFERENCE TO RELATED APPLICATION

This application is a continuation application of U.S. application Ser. No. 15/194,921, filed Jun. 28, 2016, which claims the benefit of priority of U.S. Provisional Patent Application No. 62/153,553, filed on Apr. 28, 2015, the contents of which are incorporated herein by reference in their entirety.

BACKGROUND

Technical Field

The present disclosure relates generally to systems and methods for image processing, and more particularly, to systems and methods for causing a system response in a vehicle based on traffic light detection from images.

Background Information

As technology continues to advance, more and more vehicles are equipped with sensors and driving assistance systems configured to assist the driver in safe driving. Such driving assistance systems may use cameras to capture images of the road environment surrounding the vehicle. The driving assistance systems analyze the images to identify pedestrians, road signs, traffic lights, etc., and provide warnings to the drivers. As another example, fully autonomous vehicles are being developed that can automatically navigate on the roads without driver input. Autonomous vehicles may take into account a variety of factors and make appropriate decisions based on those factors to safely and accurately reach an intended destination. For example, an autonomous vehicle may need to process and interpret visual information (e.g., images captured by a camera) and may also use information obtained from other sources (e.g., from a GPS device, a speed sensor, an accelerometer, a suspension sensor, etc.).

When a conventional or an autonomous vehicle approaches a traffic intersection, the driver or the vehicle itself may need to make a decision as to whether the vehicle should stop or whether the vehicle should proceed to safely past the traffic intersection. Sometimes drivers do not pay close attention to the status of traffic lights ahead of the vehicle. In the case of autonomous vehicle, it is still a challenging task for the autonomous vehicle to accurately determine whether it would be safe to pass an intersection based on information collected from various sensors. Therefore, it is desirable and a modern trend to equip vehicles (whether conventional or autonomous) with a system that can detect the status of the traffic light and make an appropriate and timely decision on what actions the vehicles or drivers should take in order to avoid collision at the intersection.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a system response based on, for example, an analysis of images captured by one or more of the cameras. The system response may also take into account other data including, for example, global positioning system (GPS) data, sensor data (e.g., from an accelerometer, a speed sensor, a suspension sensor, etc.), and/or other map data. The system response may include a warning to a driver, or other navigational responses, such as acceleration, deceleration, lane shift, maintaining current speed, etc.

Consistent with one embodiment, a traffic light detection system for a vehicle is provided. The system may include at least one processing device programmed to receive, from at least one image capture device, a plurality of images representative of an area forward of the vehicle, the area including a traffic light fixture having at least one traffic light. The at least one processing device may also be programmed to analyze at least one of the plurality of images to determine a status of the at least one traffic light, and determine an estimated amount of time until the vehicle will reach an intersection associated with the traffic light fixture. The at least one processing device may further be programmed to cause a system response based on the status of at least one traffic light and the estimated amount of time until the vehicle will reach the intersection.

Consistent with another embodiment, a traffic light detection system for a vehicle is provided. The system may include at least one processing device programmed to receive, from at least one image capture device, a plurality of images representative of an area forward of the vehicle, the area including a traffic light fixture having at least one traffic light. The at least one processing device may also be programmed analyze at least one of the plurality of images to determine a status of the at least one traffic light. The at least one processing device may also be programmed to determine a distance from the vehicle to an intersection. The at least one processing device may further be programmed to cause a system response based on the status of at least one traffic light and the distance from the vehicle to the intersection.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
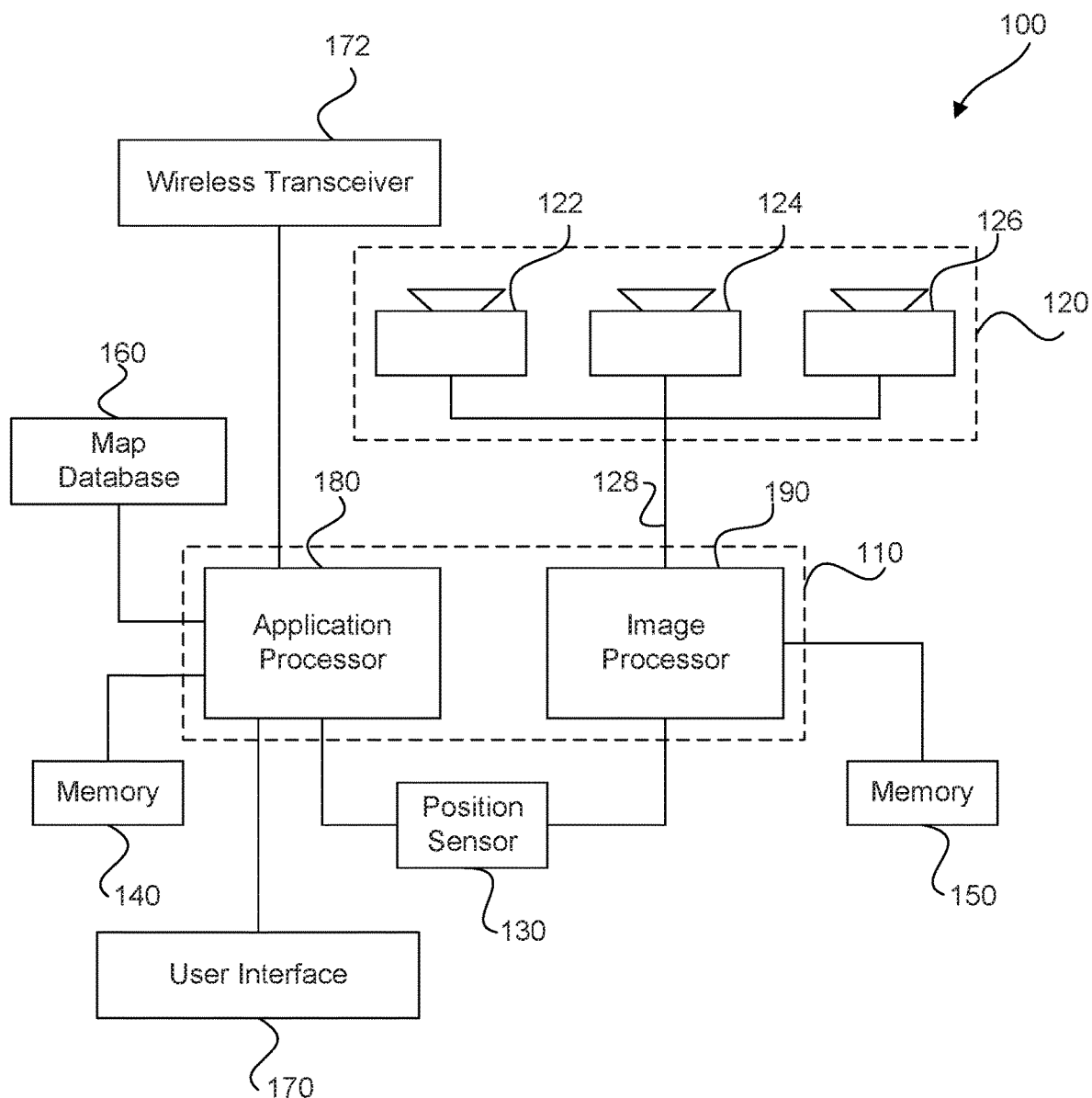
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle. In some cases, autonomous vehicles may be classified into different levels representing the degree of automation. For example, the United States National Highway Traffic Safety Administration classifies the autonomous vehicles into four levels: level 0 being vehicles without automation; level 1 being vehicles with function-specific automation; level 2 being vehicles with combined function automation; level 3 being vehicles with limited self-driving automation; and level 4 being vehicles with full self-driving automation.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.).

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer) for measuring a speed of vehicle 200 and/or an accelerometer for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
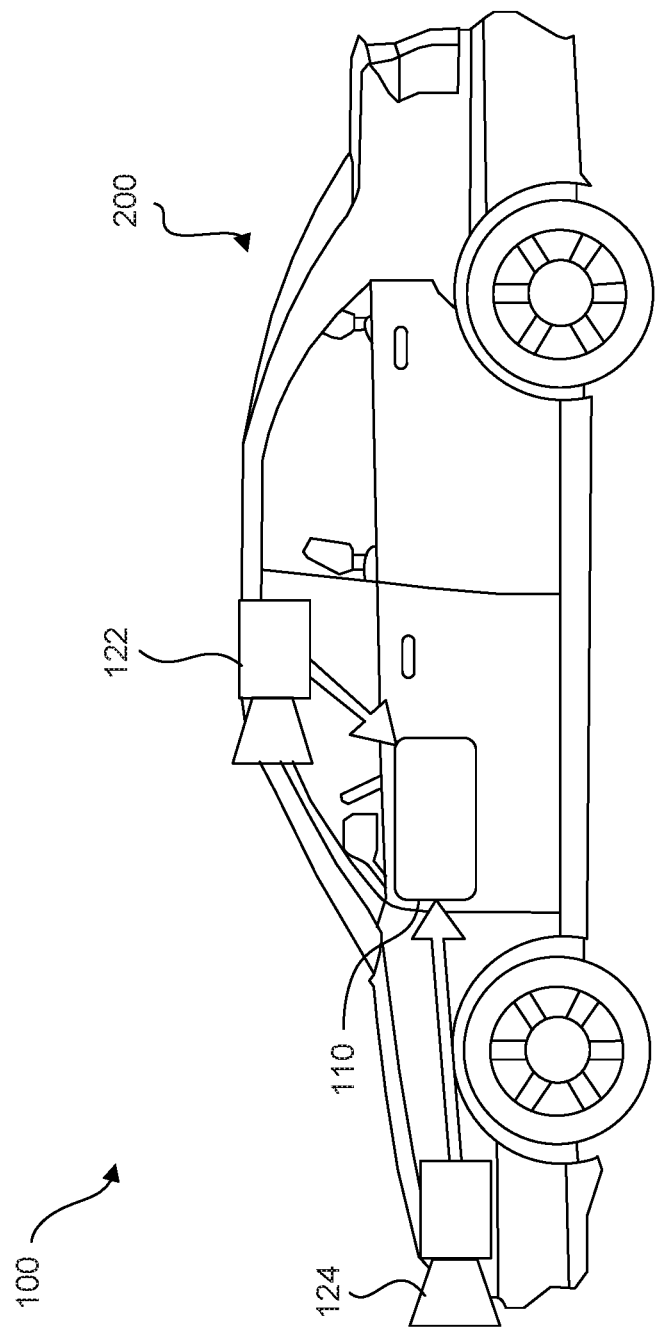
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
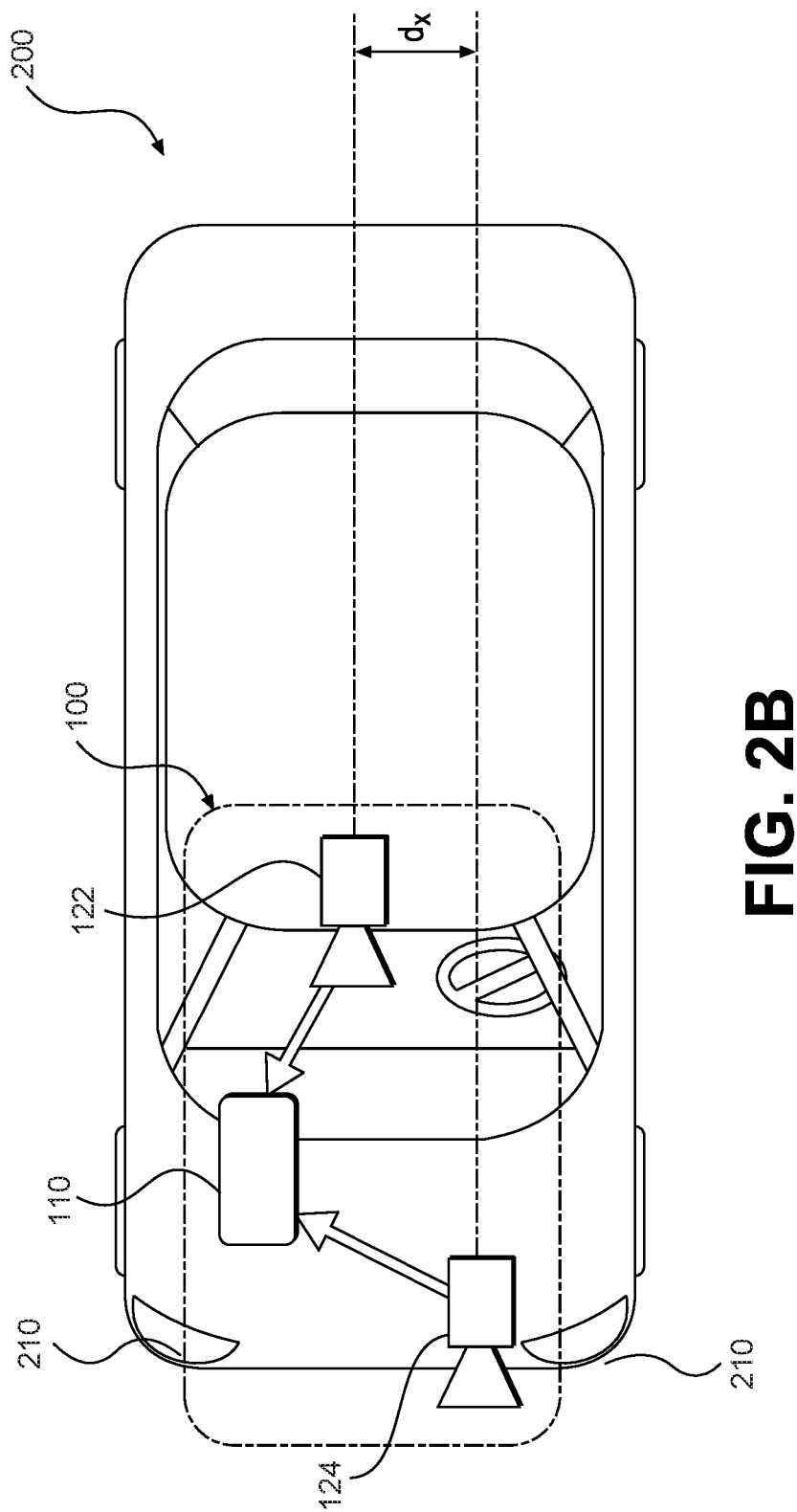
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
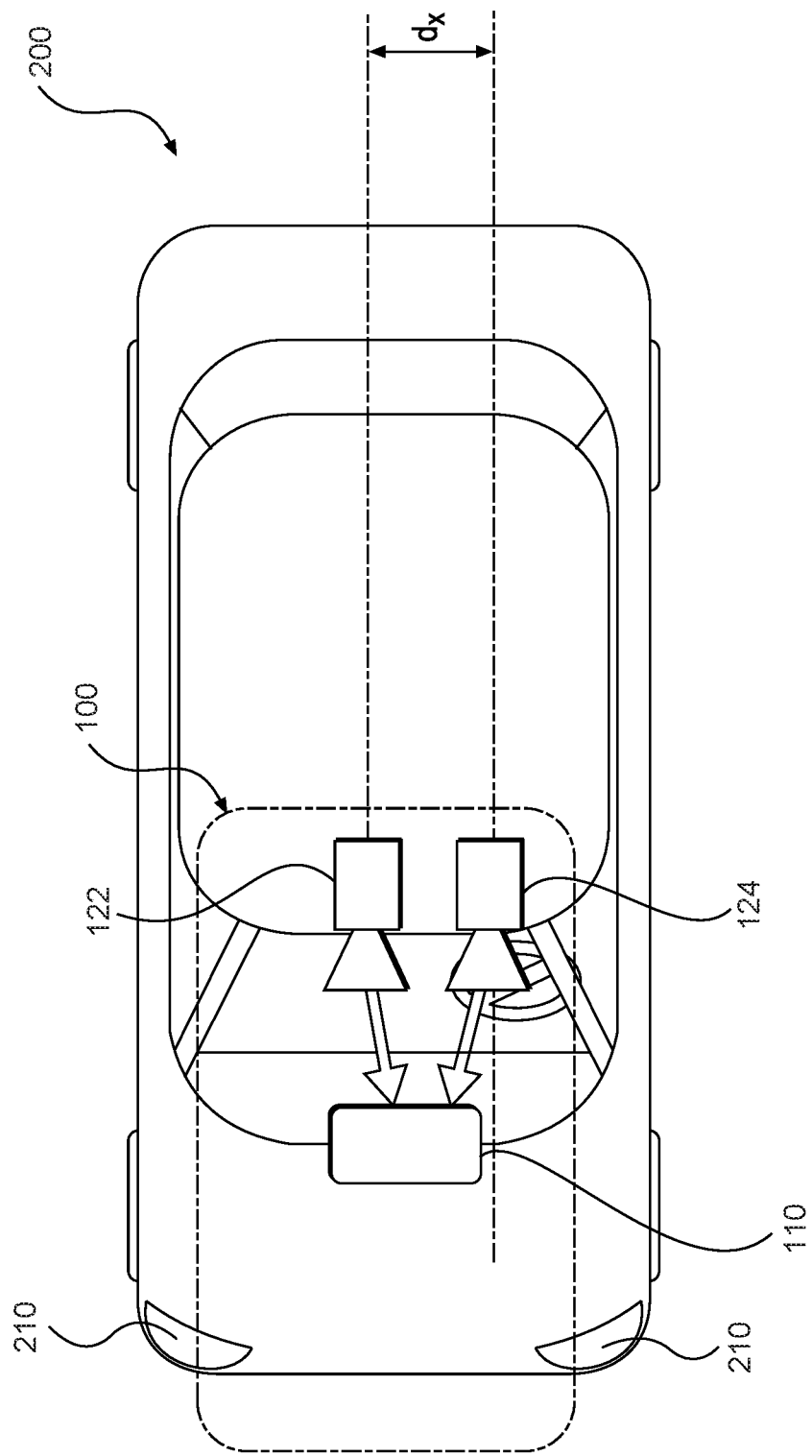
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
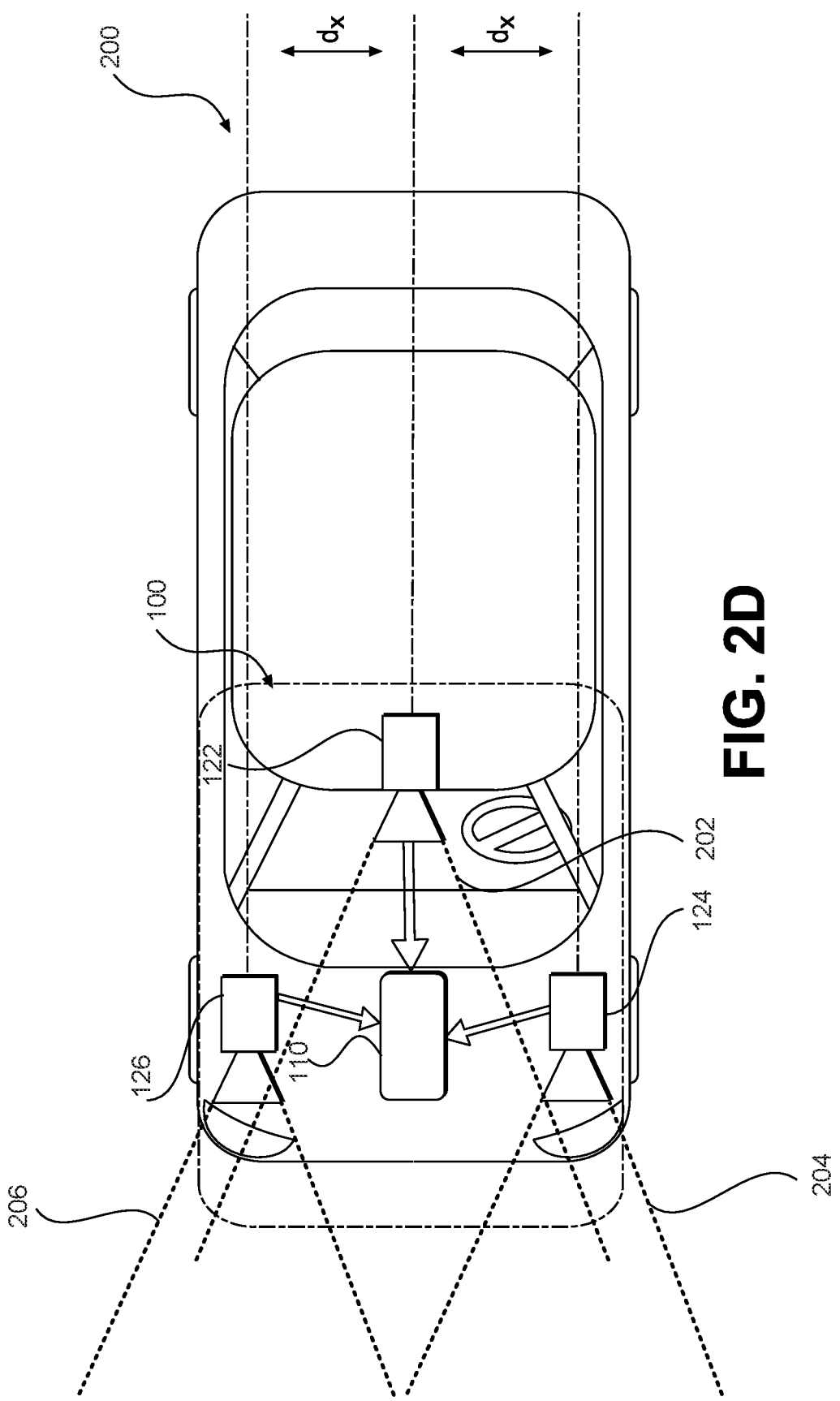
FIG. 2D is a diagrammatic top view representation of yet another embodiment of a vehicle including a system consistent with the disclosed embodiments.
Figure 2E:
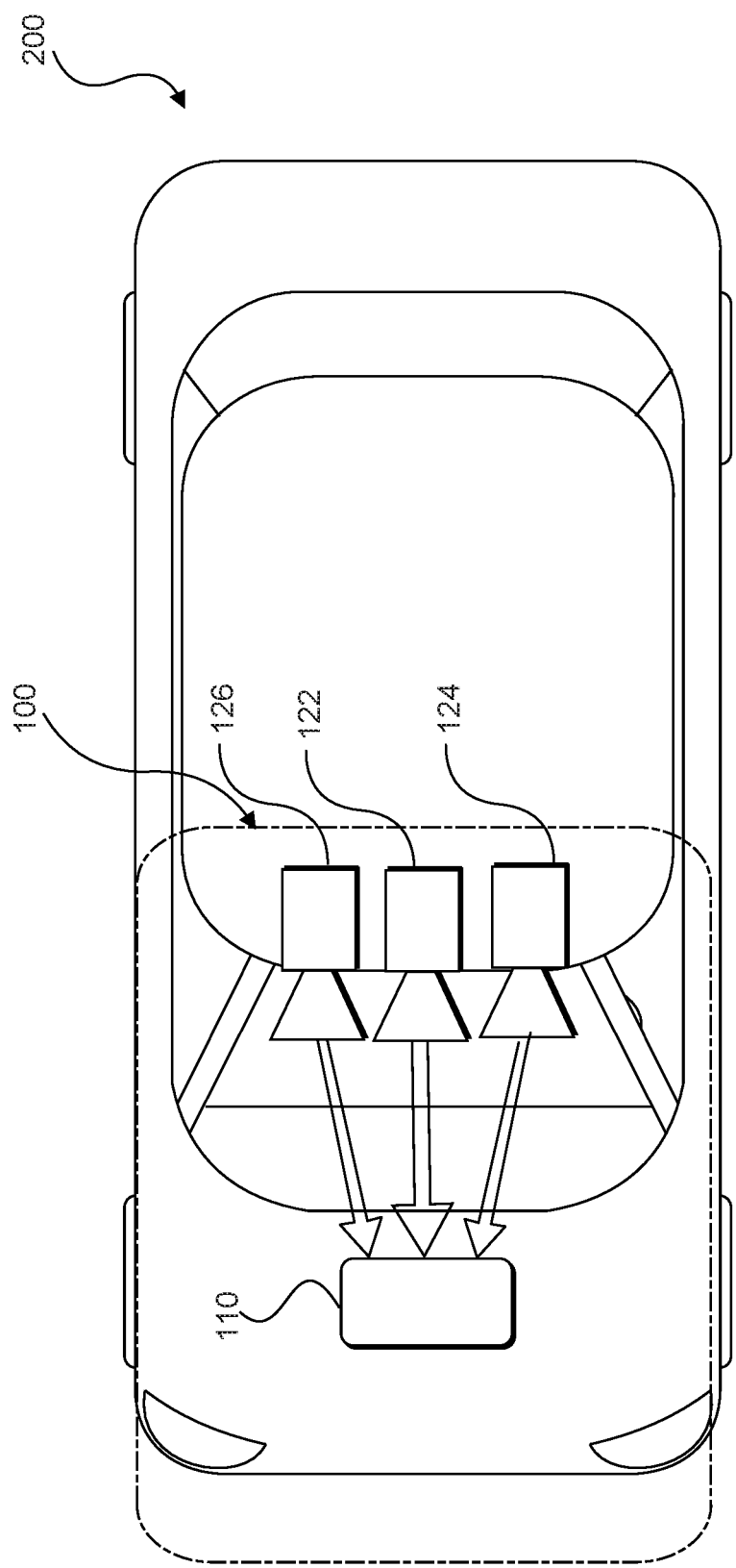
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2 M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5 M pixel, 7 M pixel, 10 M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
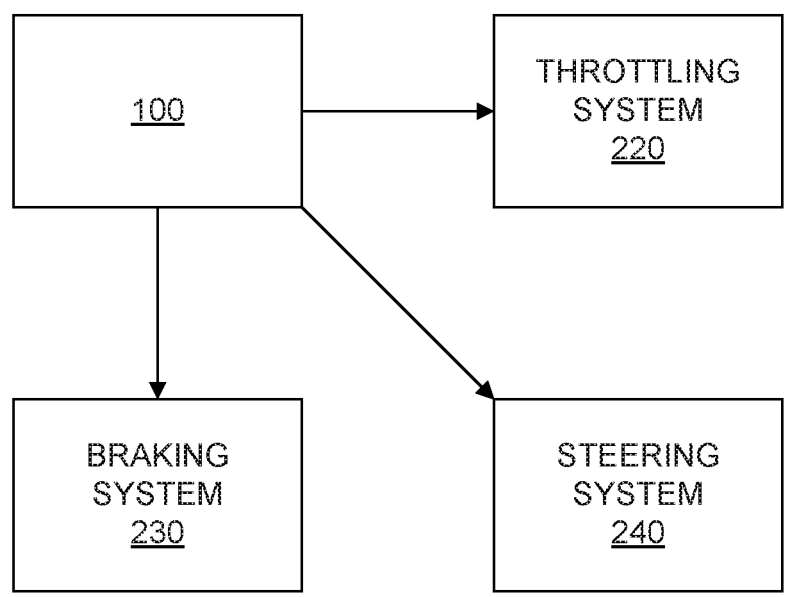
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
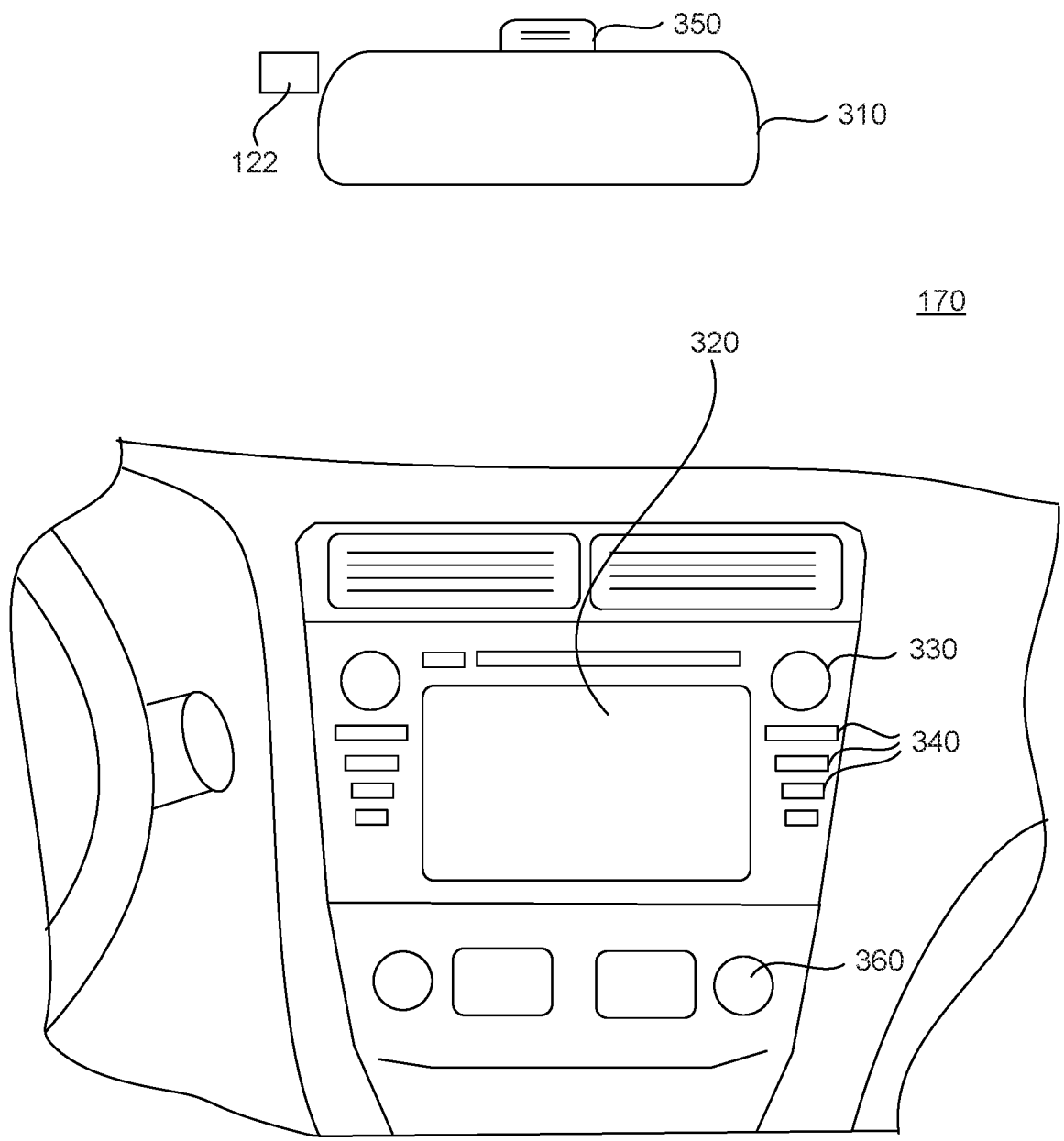
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
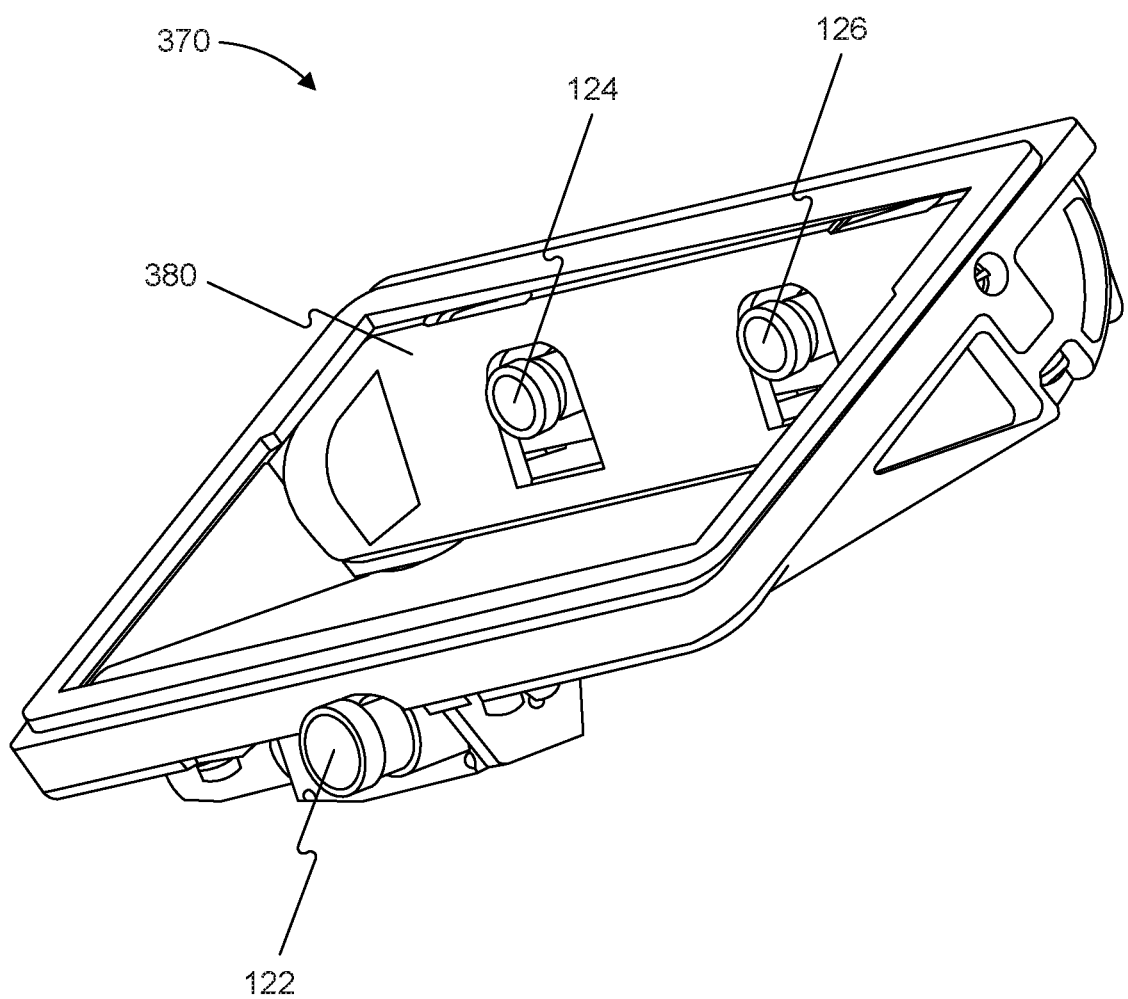
FIG. 3B is an illustration of an example of a camera mount that is configured to be positioned behind a rearview mirror and against a vehicle windshield consistent with the disclosed embodiments.
Figure 3C:
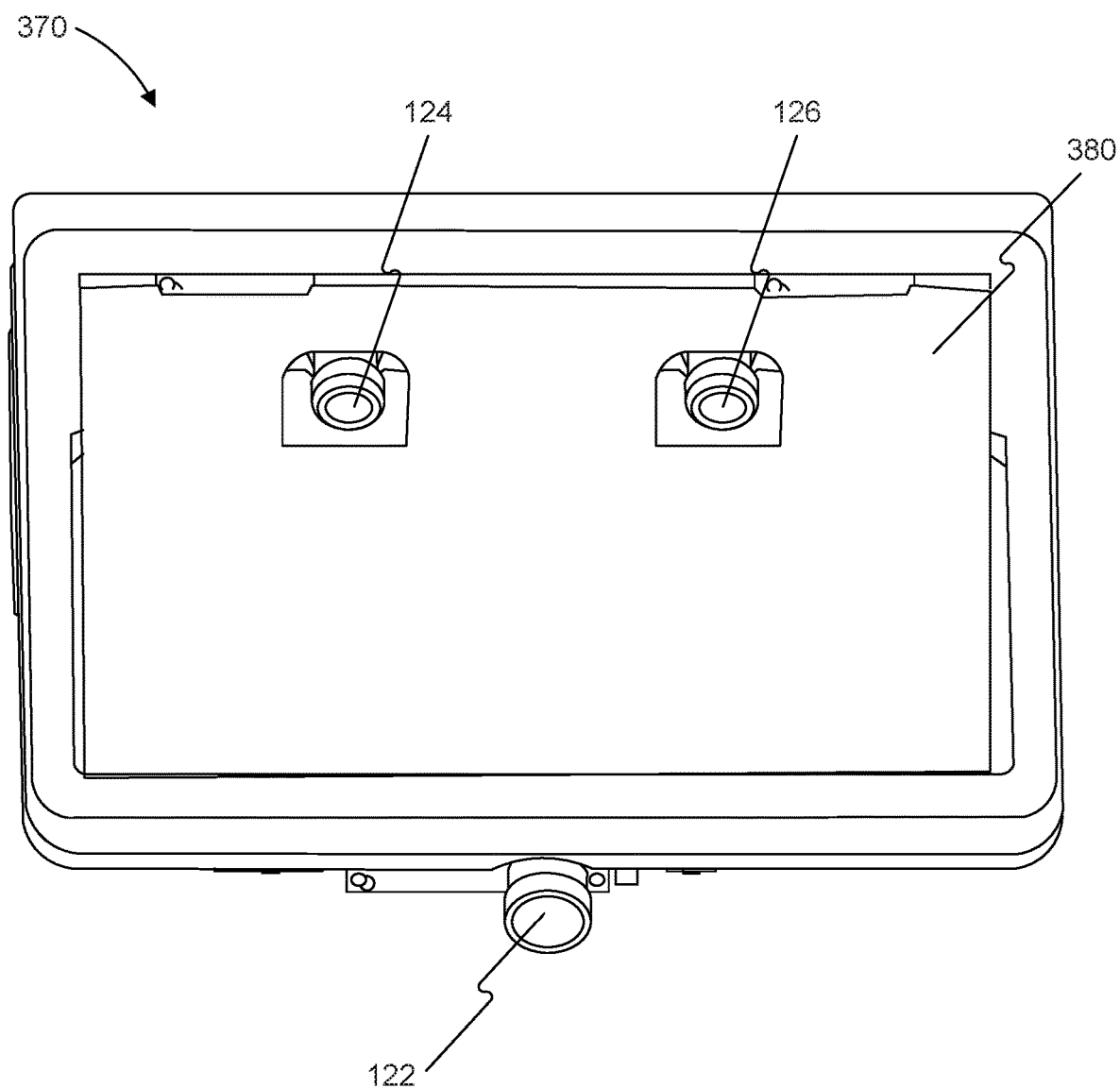
FIG. 3C is an illustration of the camera mount shown in FIG. 3B from a different perspective consistent with the disclosed embodiments.
Figure 3D:
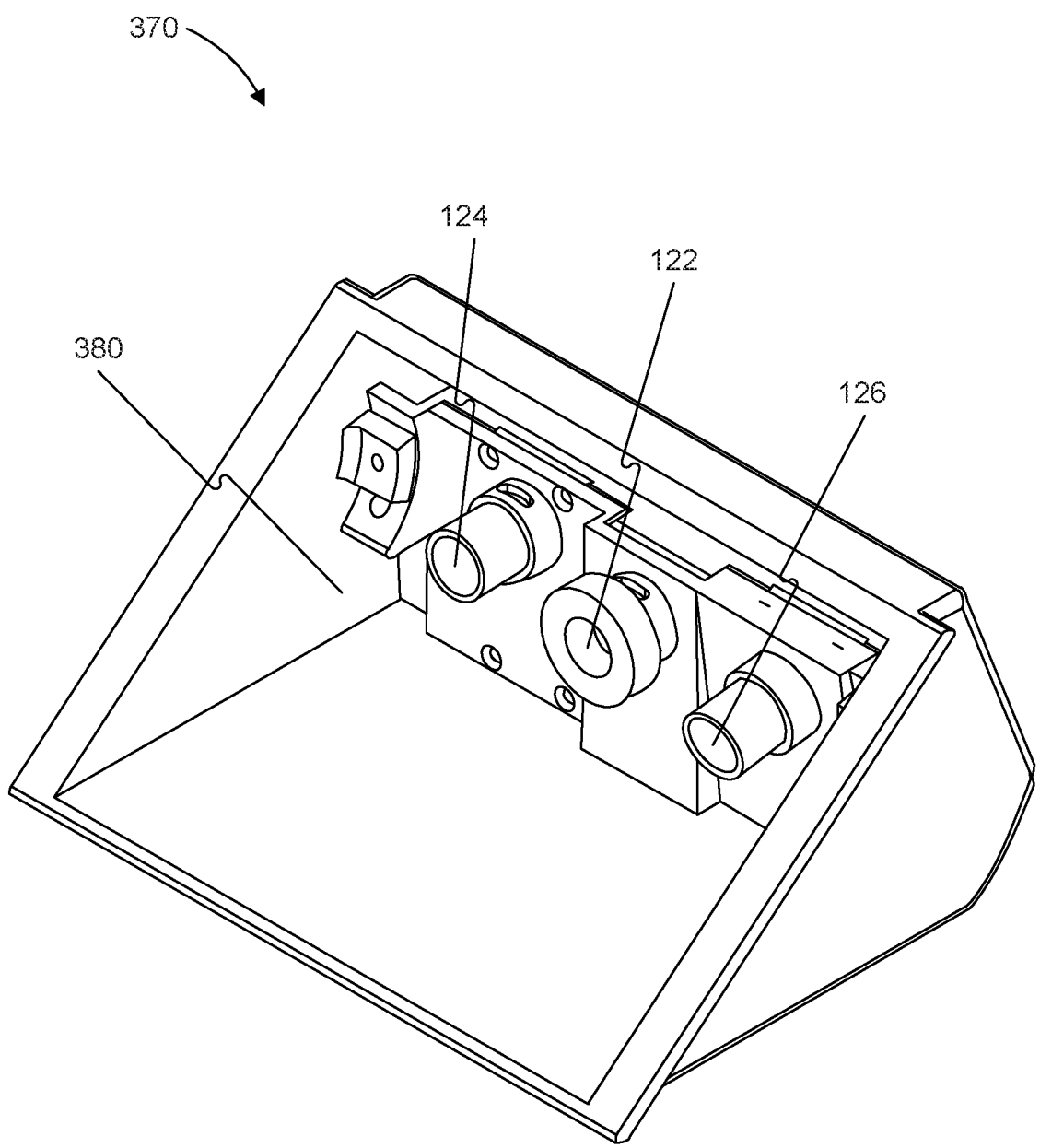
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
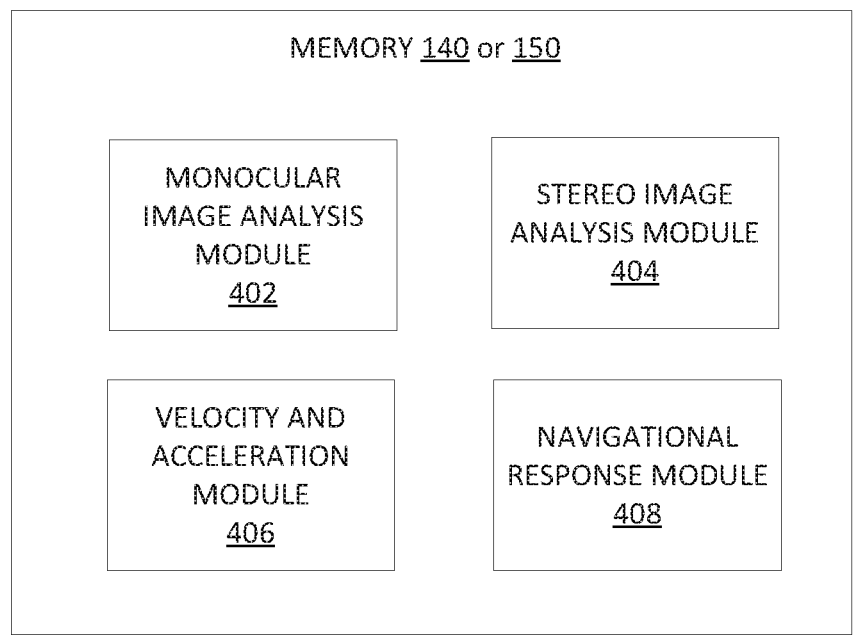
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
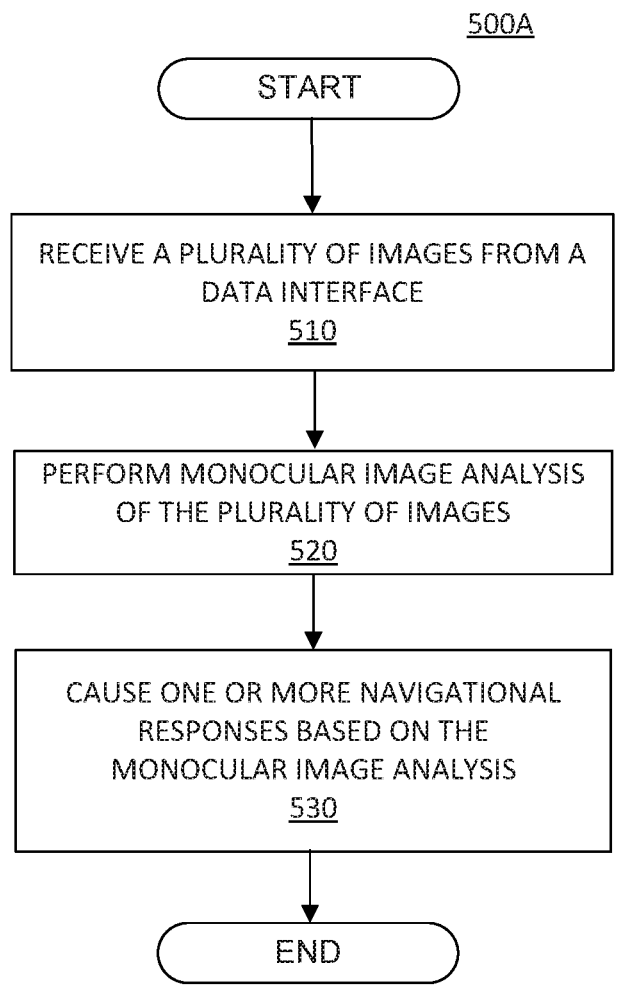
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
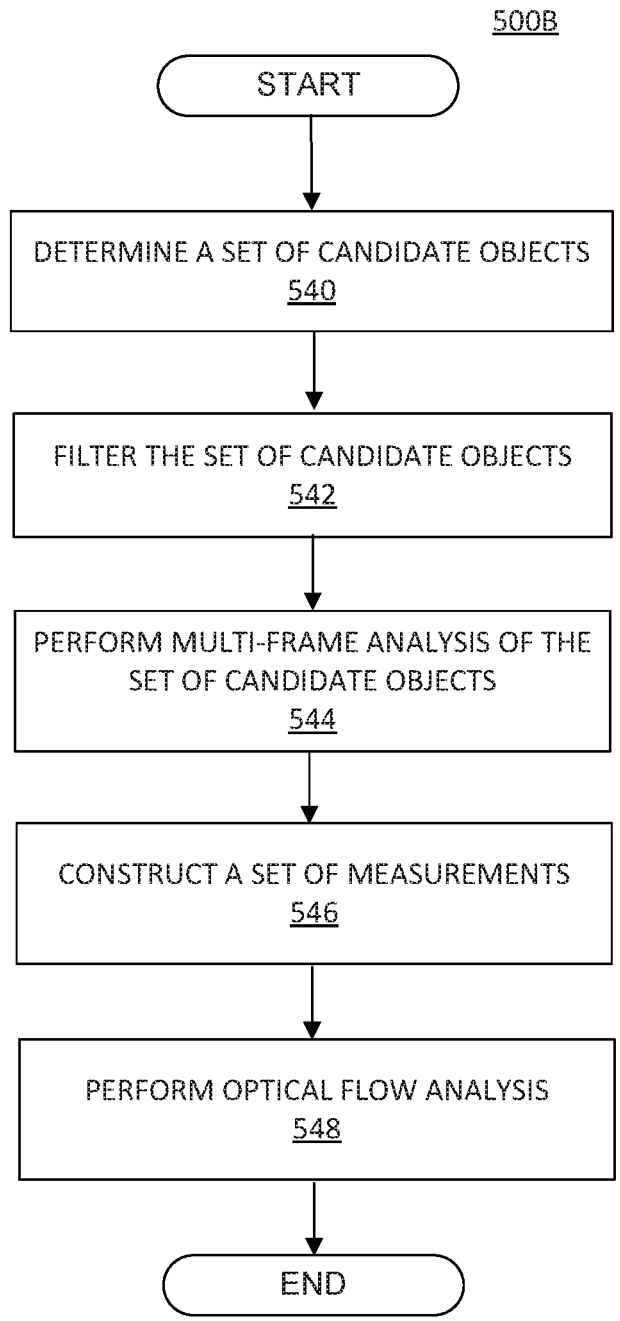
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
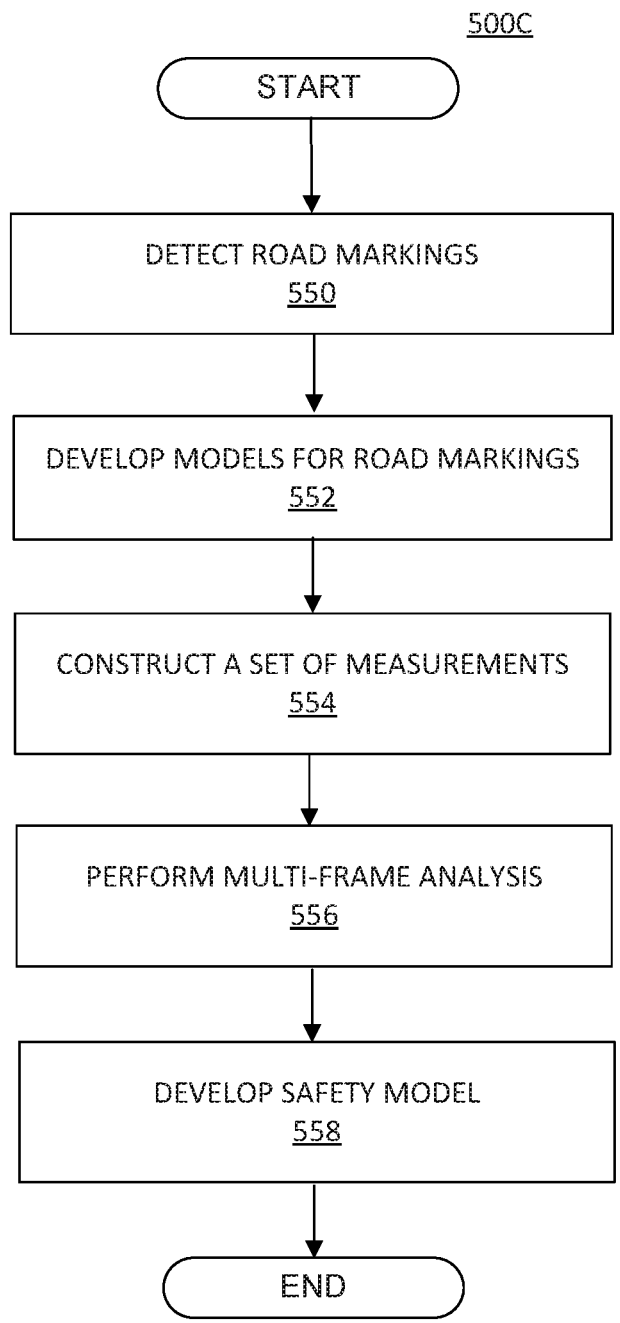
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
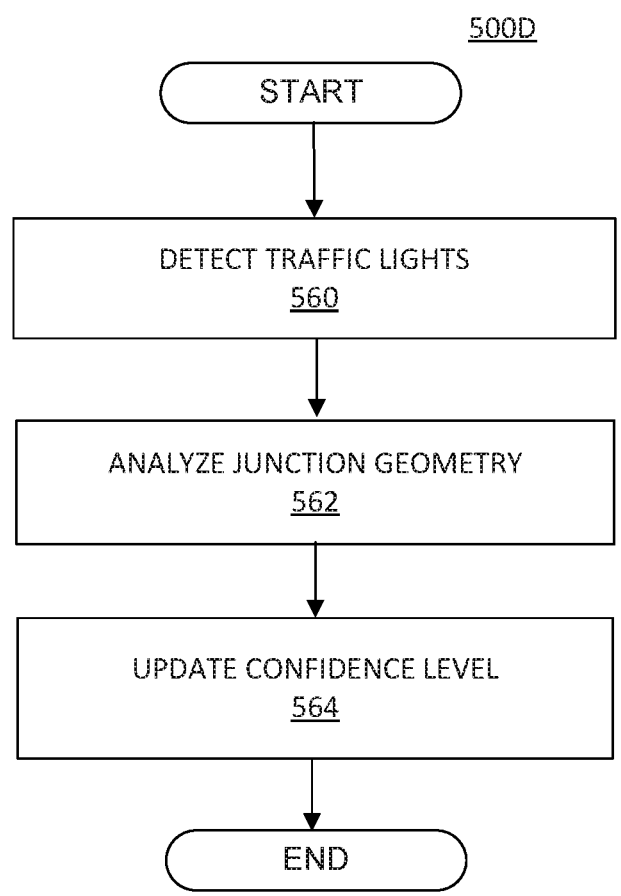
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Traffic lights may use a lamp, an LCD or LED display or light emitting device, or other lighting technology. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
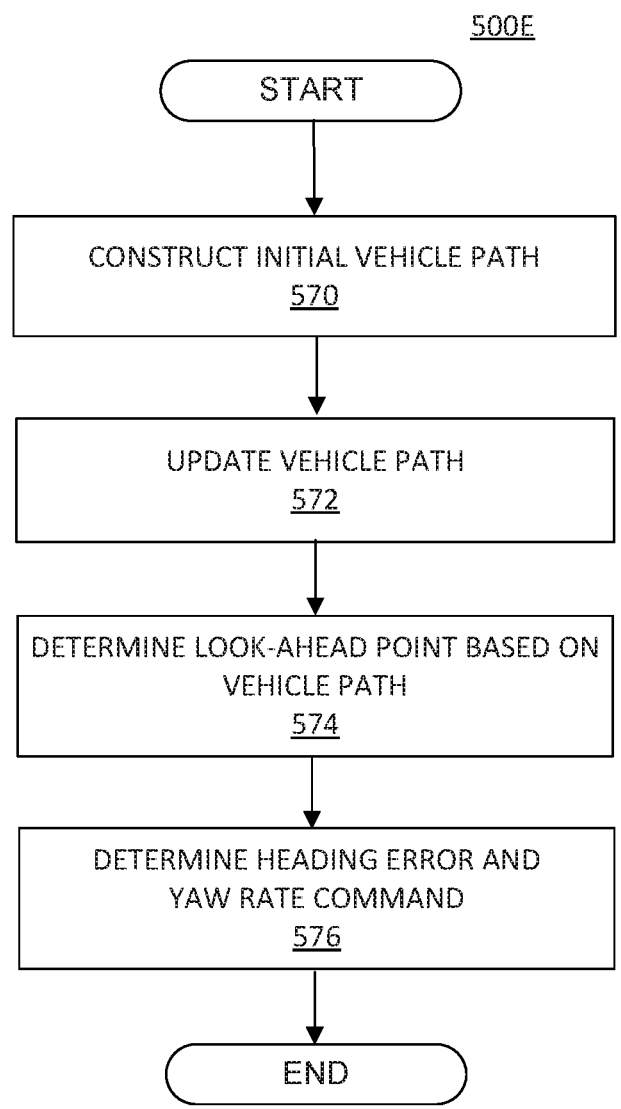
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
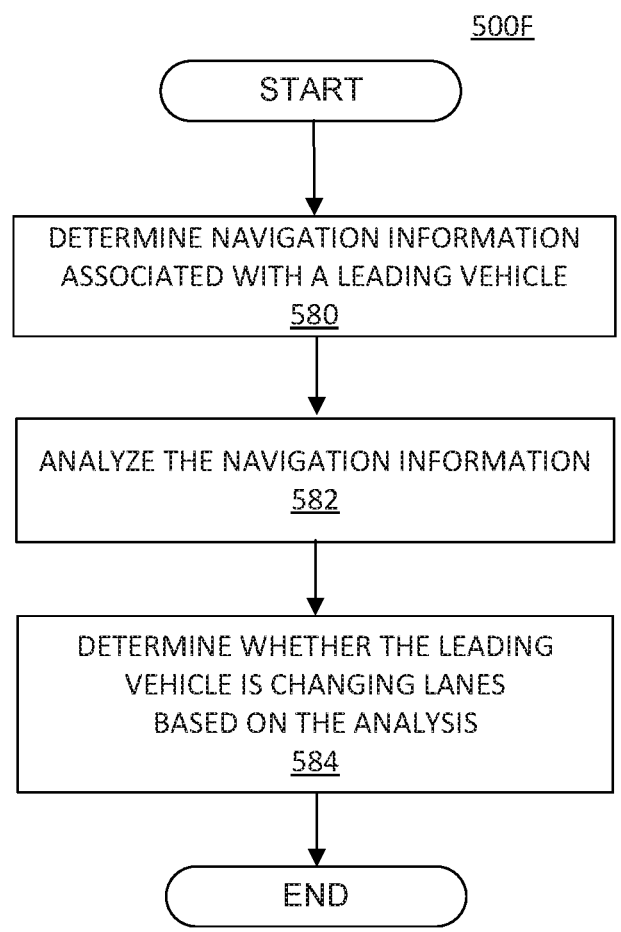
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/$ $2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
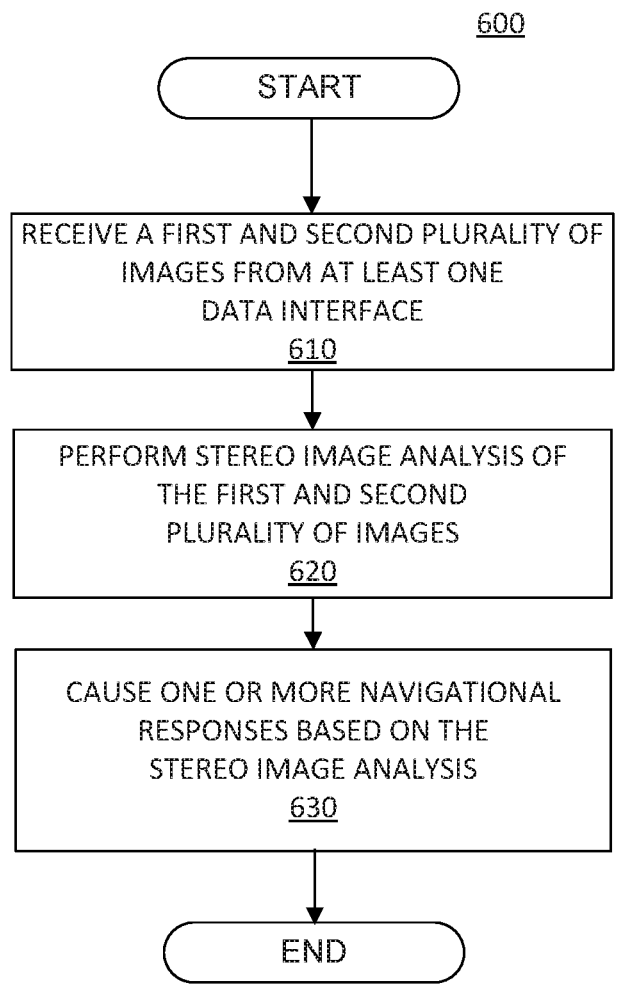
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
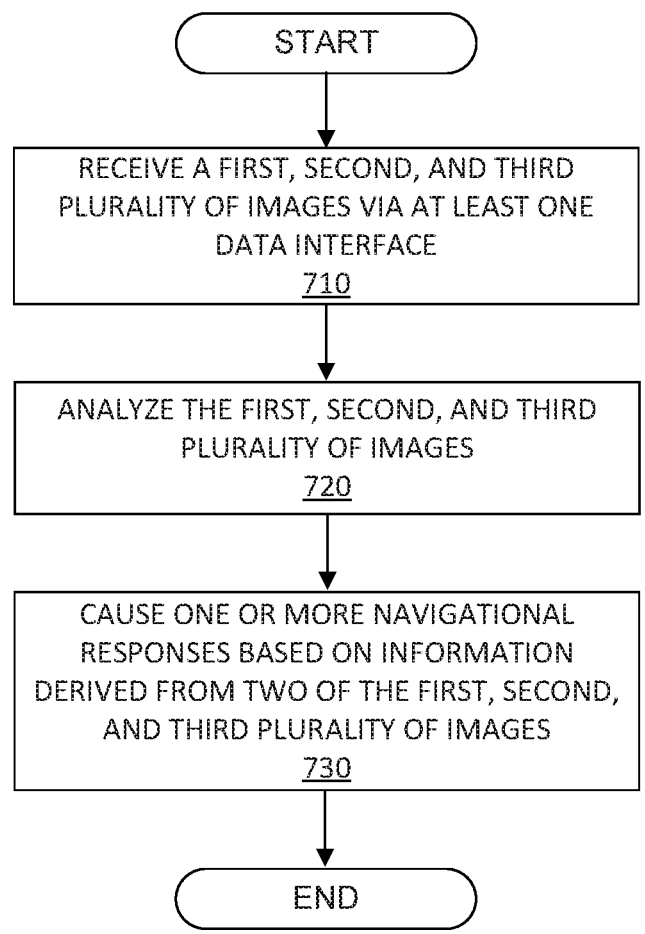
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126— including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

System Response Based on Traffic Light Detection

Figure 8:
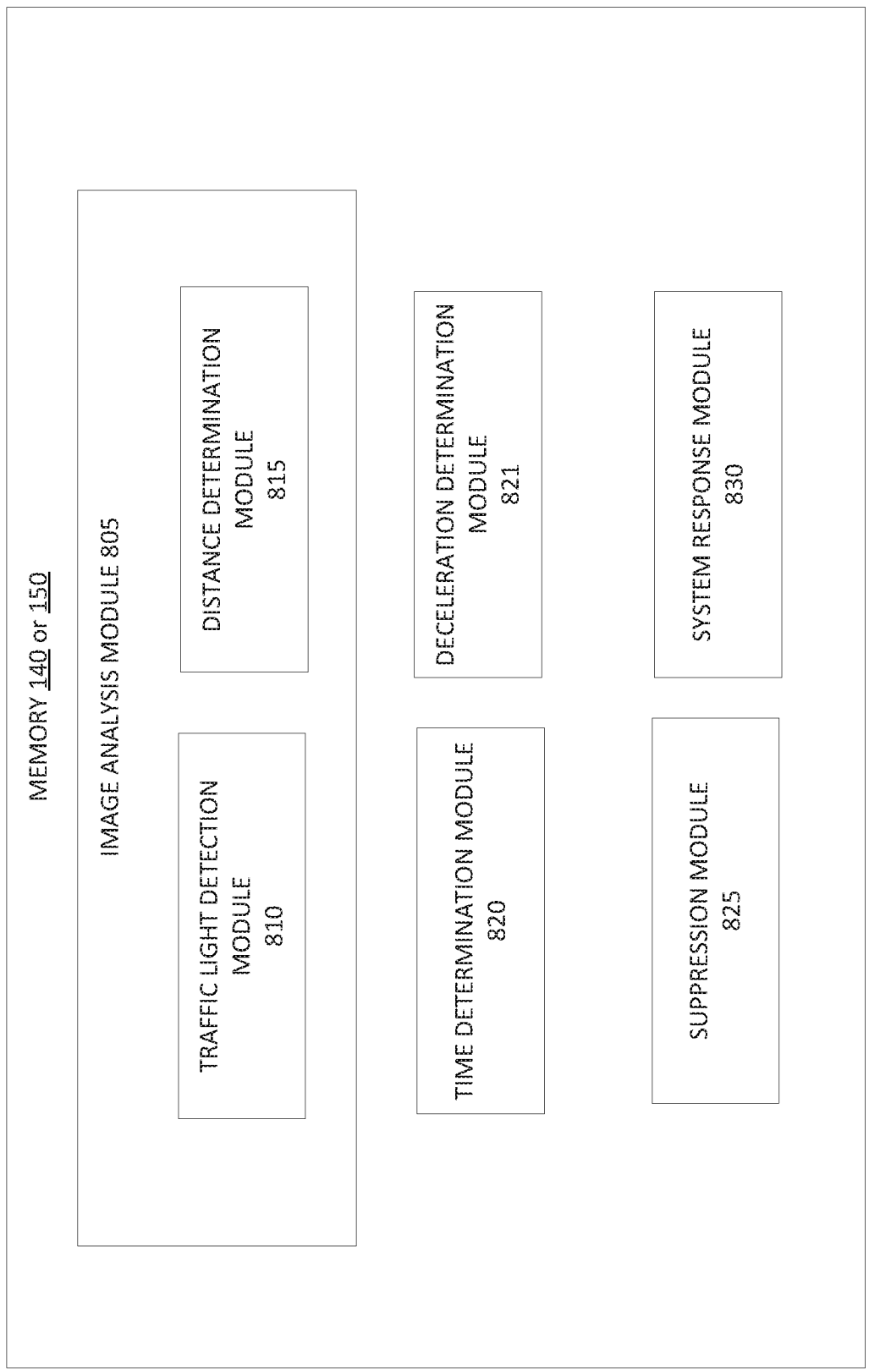
FIG. 8 is an exemplary functional block diagram of a memory configured to store instructions for performing one or more operations consistent with the disclosed embodiments.

FIG. 8 is an exemplary functional block diagram of memory 140 and/or 150, which may be stored or programmed with instructions for performing one or more operations consistent with the disclosed embodiments. Although the following refers to memory 140, one of skill in the art will recognize that instructions may be stored in memory 140 and/or 150.

As shown in FIG. 8, memory 140 may store an image analysis module 805. Image analysis module 805 may include a traffic light detection module 810 and a distance determination module 815. In some embodiments, traffic light detection module 810 and distance determination module 815 may be separately provided, rather than being parts of image analysis module 805. In some embodiments, image analysis module 805 may include other dedicated modules, for example, for extracting various features from captured images.

Memory 140 may also include a time determination module 820, a deceleration determination module 821, a suppression module 825, and a system response module 830. The disclosed embodiments are not limited to any particular configuration of memory 140. Further, application processor 180 and/or image processor 190 may execute the instructions stored in any of modules 805-830 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, image analysis module 805 may store instructions (such as computer vision software) which, when executed by processing unit 110, performs image analysis (e.g., monocular image analysis) of a set of images acquired by at least one of image capture devices 122, 124, and 126. For example, image capture device 122 may acquire at least one image of an area forward or ahead of a vehicle. An "area forward of the vehicle" includes any geographical region located in front of a vehicle, relative to its moving direction. The region may include a junction, an intersection, a crossroad, a traffic circle, a street, a road, etc. Hereinafter, the term "intersection" may be interchangeable with the term junction or crossroad where two or more roads meet together. In some cases, the area forward or ahead of the vehicle may include a plurality of traffic light fixtures each including at least one traffic light. A "traffic light fixture" includes any form of structure housing one or more light-producing devices used to regulate traffic and/or to provide road-related information. In some cases, two or more traffic light fixtures may be joined in a single traffic light assembly, but each traffic light fixture may be associated with a different lane. A typical traffic light fixture may include three circular traffic lights: a green traffic light, a yellow traffic light, and a red traffic light. A "traffic light" includes a device having at least one light source capable of displaying a distinctive color. In some cases, the vehicle may encounter a non-typical traffic light fixture. A non-typical traffic light fixture may include one or more non-circular traffic lights having different colors. For example, a right-turn arrow traffic light, a left-turn arrow traffic light, a public transportation traffic light, a pedestrian crossing traffic light, a bicycle crossing traffic light, etc.

In some embodiments, processing unit 110 may combine information from a set of images with additional sensory information (e.g., information from radar) to perform the image analysis. Image analysis module 805 may include instructions for detecting a set of features within the set of images, such as lane markings, vehicles, pedestrians, road signs, highway exit ramps, traffic lights, hazardous objects, distances, and any other features associated with an environment of a vehicle. In some embodiments, image analysis module 805 may include individual modules for detecting different features from the captured images.

In one embodiment, traffic light detection module 810 may store instructions (such as computer vision software) which, when executed by processing unit 110, performs image analysis of one or more images acquired by at least one of image capture devices 122, 124, and 126. In some embodiments, processing unit 110 may analyze the one or more images to detect a shape of the traffic light, a color of the traffic light, a transition of colors, a location of the traffic light, etc. Processing unit 110 may determine the status of a traffic light (red, green, yellow, or transitioning from green to yellow, yellow to red, or red to green). Processing unit 110 may also detect, from the one or more images, the relevancy of a traffic light to vehicle 200. For example, processing unit 110 may determine whether a traffic light regulates a lane in which vehicle 200 is traveling. Based on the analysis, processing unit 110 may cause one or more system responses in vehicle 200, such as a warning to a driver, or other navigational responses such as a turn, a lane shift, an acceleration, a deceleration (e.g., by a brake), maintaining current speed, and the like, as discussed below in connection with system response module 830.

Distance determination module 815 may store software configured to analyze one or more images captured by at least one of image capture devices 122, 124, and 126. In some embodiments, processing unit 110 may analyze the images to determine a distance from vehicle 200 to an intersection (also referred to as a junction). The term "distance to an intersection" or "distance to a junction" refers to the distance from the vehicle to a starting location of the junction. For example, in some situations, the starting location of the junction is marked with a stop line, or a pedestrian crossing line. In such situations, the distance to the junction refers to the distance from the vehicle to the stop line or pedestrian crossing line. In other situations, the starting location of the junction is not marked with a stop line or a pedestrian crossing line. In such situations, the distance to the junction refers to the distance from the vehicle to the starting location where the stop line or pedestrian crossing line is supposed to be.

The distance to the junction (e.g., the end of the current lane in which the vehicle is travelling that meets one or more lanes of one or more crossing roads) may be determined based on the distance from the vehicle to the stop line (or pedestrian crossing line), if such a marking is visible on the road, as captured in the images. In some embodiments, the distance to the junction may be determined based on the distance from the vehicle to a reference point which is at a certain distance (e.g., 10 cm) from the stop line in the images. When the stop line or pedestrian crossing line is not visible on the road (or is not visible in the captured images), the distance to the junction may be determined based on the distances of the vehicle to one or more traffic lights or traffic light fixtures on which the traffic lights are attached, which are included in the captured images. In yet some embodiments, whether a stop line exists on the ground or not, the reference point for calculating the distance from the vehicle to the junction may be a certain distance, fixed or not, from the point where good visibility of crossing traffic or any other visual or infrastructure related condition or criterion is met, specifically when the reference point and the location of the host vehicle relative to the reference point can be determined from an image of an environment of the junction, as captured by an imaging device onboard the vehicle approaching the junction. Based on the distance to the junction, system 100 (e.g., via processing unit 110) may determine whether one or more conditions for causing a system response are satisfied. The system response may include a warning or alert notification to a driver, or other navigational responses such as a turn, a lane shift, an acceleration, a deceleration (e.g., by a braking), maintaining current speed, and the like, as discussed below in connection with system response module 830.

When system 100 determines that the one or more conditions are satisfied, system 100 may send a control signal to a suitable component of vehicle 200, e.g., a display, a speaker, a vehicle control system such as throttling system 220, braking system 230, and/or steering system 240, to cause the system response. For example, a visual alert message may be displayed on the on-board display to the driver. Alternatively or additionally, an auditory message may be sounded to alert the driver. In some embodiments, system 100 may cause an automatic navigational response (regardless of whether the vehicle is a conventional vehicle operated by a driver or an autonomous vehicle), such as braking to decelerate, accelerating, shifting a lane, or maintaining the current speed. For example, when a red traffic light is detected at a certain distance ahead of the vehicle, system 100 may cause the vehicle to gradually reduce its speed, e.g., at a certain deceleration, such as 2.5 m/s$^2$, 3.0 m/s$^2$, 3.5 m/s$^2$, or any other suitable deceleration that system 100 may determine based on the current speed of the vehicle and the distance from the vehicle to the junction. In some embodiments, system 100 may dynamically calculate the deceleration needed for the vehicle to stop before the junction as the vehicle moves closer to the junction. For example, system 100 may re-calculate the deceleration needed whenever the vehicle travels 10 meters toward the junction, and cause the vehicle to dynamically update the deceleration with the re-calculated value.

In some embodiments, processing unit 110 may execute instructions to analyze images showing the intersection including the traffic light to determine a present distance from the vehicle to the intersection (e.g., to a stop line, a traffic light, or a traffic light fixture) using an optical flow method or any other methods known in the art that can estimate the distance based analysis of the captured images. Additionally or alternatively, the distance from the vehicle to the intersection (e.g., to the stop line, the traffic light, or the traffic light fixture) may be determined using other sensors, such as radar and/or laser sensors, infrared sensors, GPS sensors, etc.

In one embodiment, time determination module 820 may store software executable by processing unit 110 to determine an estimated amount of time until vehicle 200 will reach an intersection associated with the traffic light fixture. For example, processing unit 110 may analyze a plurality of images using an optical flow method to determine the estimated amount of time (also referred to as time to contact or TTC). In some embodiments, processing unit 110 may determine the estimated TTC based on an expansion of a focus of field of view, as derived from analyzing a plurality of images (e.g., sequentially acquired images). In some embodiments, processing unit 110 may determine the TTC based on the current distance from the vehicle to the intersection (e.g., to the stop line, to the traffic light, or to the traffic light fixture), the current speed of the vehicle, and the current acceleration of the vehicle using any methods known in the art. Processing unit 110 may compare the TTC with a predetermined time threshold. Based on the comparison, e.g., when TTC is smaller than or equal to the predetermined time threshold, processing unit 110 may cause one or more system responses in the vehicle, such as a warning to a driver, or other navigational responses such as a turn, a lane shift, an acceleration, a deceleration (e.g., by braking), maintaining current speed, and the like, as discussed below in connection with system response module 830.

In one embodiment, deceleration determination module 821 may store software executable by processing unit 110 to determine a minimum deceleration required to be applied to the vehicle, such that the vehicle can stop before reaching the intersection (e.g., at the end of the current distance from the vehicle to the stop line, as estimated by distance determination module 815). Processing unit 110 may compare the minimum deceleration with a predetermined deceleration threshold. Based on the comparison (e.g., when the minimum deceleration is greater than or equal to the predetermined deceleration threshold), processing unit 110 may cause one or more system responses in vehicle 200, such as a warning to a driver, or other navigational responses such as a turn, a lane shift, an acceleration, a deceleration (e.g., by a brake), maintaining current speed, and the like, as discussed below in connection with system response module 830.

In some embodiments, processing unit 110 may determine whether to cause a system response based on both the TTC and the minimum deceleration. For example, processing unit 110 may cause a system response when both the TTC is equal to or less than a predetermined time threshold and the minimum deceleration is equal to or greater than a predetermined deceleration threshold.

In one embodiment, suppression module 825 may store software executable by processing unit 110 to determine whether a system response should be suppressed. Suppression module 825 may store various pre-set suppression schemes. Processing unit 110 may determine whether information detected from captured images and other sensors satisfies pre-set requirements for suppressing a system response, such that processing unit 110 does not cause a system response (e.g., an alert or warning notification to the driver, acceleration, deceleration, etc.) in the vehicle. For example, the pre-set suppression schemes may include at least one of suppressing a system response based on vision information (e.g., information included in the images captured by the cameras) and suppressing a system response based on driver behavior that indicates that the driver is taking control of vehicle 200.

In one embodiment, system response module 830 may store software executable by processing unit 110 to cause a system response. For example, based on at least one of traffic light status (e.g., as determined by traffic light detection module 810), a distance from vehicle 200 to a traffic light fixture (e.g., as determined by distance determination module 815), TTC estimation (e.g., as determined by time determination module 820), minimum deceleration required for vehicle 200 to stop before entering the intersection (e.g., as determined by deceleration determination module 821), and determination related to suppression schemes (e.g., as determined by suppression module 825), processing unit 110 may determine whether to cause a system response in vehicle 200. If it is determined that a system response should be caused in vehicle 200, system response module 830 may send a signal to a component of vehicle 200 to cause the response. For example, when it is determined that a warning or alert notification should be provided to the driver of vehicle 200 about a red traffic light ahead of vehicle 200, processing unit 110 may cause an alert to be presented to the driver. The alert may be presented to the driver as a visual alert (e.g., displaying a warning sign on an on-board display or flashing a light or an icon on an instrument panel), an audio alert (e.g., providing a beeping sound through a speaker), a tactile alert (e.g., causing vibration of the driver's seat or vibration of the steering wheel), or any combination of these alerts.

In some embodiments, processing unit 110 may cause one or more navigational responses in vehicle 200, such as a turn, a shift of lane, an acceleration, a deceleration, a braking, maintaining current speed, etc. Processing unit 110 may provide control signals to throttling system 220, braking system 230, and/or steering system 240 to cause the system response. For example, processing unit 110 may transmit electronic signals that cause system 100 to physically apply the brakes by a predetermined amount or ease partially off the accelerator of vehicle 200. Further, processing unit 110 may transmit electronic signals that cause system 100 to steer vehicle 200 in a particular direction. Such responses may be based on the determination of the relevant traffic light. Further, processing unit 110 may determine that it is safe to pass the intersection if the current speed is maintained, and may cause throttling system 220 to maintain the current speed.

In some embodiments, system 100 may distinguish between relevant and irrelevant (or less relevant) traffic lights. During a typical driving session, vehicle 200 may cross one or more junctions or intersections having multiple traffic lights. For example, one or more of the traffic lights at an intersection may regulate traffic traveling toward the intersection in a particular direction. Accordingly, one or more traffic lights may regulate whether vehicle 200 may continue to travel through the intersection or whether vehicle 200 must stop at the intersection. However, in addition to the traffic lights that regulate the lane in which vehicle 200 is traveling, other traffic lights that regulate traffic in other lanes may be visible to vehicle 200.

Navigating vehicle 200 according to any of the traffic lights that regulate lanes other than the lane in which vehicle 200 is traveling may result in navigational responses undesirable or inapplicable to the intended route of vehicle 200. Accordingly, to enable control of vehicle 200 in a manner appropriate to the intended navigational path of vehicle 200, system 100 may identify which of a plurality of traffic lights is regulating traffic in the lane in which vehicle 200 is traveling while disregarding other traffic lights that regulate other lanes of traffic. In some embodiments, system 100 may allocate less processing resources or assign a lower processing priority to the other traffic lights detected in the images that regulate other lanes of traffic. In some embodiments, system 100 may assign a lower weight for a driving scenario related to the other traffic lights detected in the images that regulate other lanes of traffic. Further, after system 100 identifies a relevant traffic light, system 100 may identify a status of the traffic light (e.g., red, yellow, green) and implement an appropriate navigational response. For example, system 100 may discontinue cruise control and apply the brakes when a red light is recognized that regulates the lane in which vehicle 200 is traveling or when a yellow light is recognized that regulates the lane in which vehicle 200 is traveling and vehicle 200 is beyond a predetermined distance of a junction. In some embodiments, system 100 may compute several scenarios related to different traffic lights detected in the images, and may assign each scenario with a different likelihood of being relevant to vehicle 200. Optionally, system 100 may also compute one or more possible navigational responses associated the different traffic lights in different scenarios. As vehicle 200 travels toward the traffic lights, the scenarios may be dynamically updated by system 100. As the scenarios progress, some navigational responses may gradually receive a higher score, while others may become less likely (e.g., receive a lower score), or are even eliminated altogether.

Figure 9:
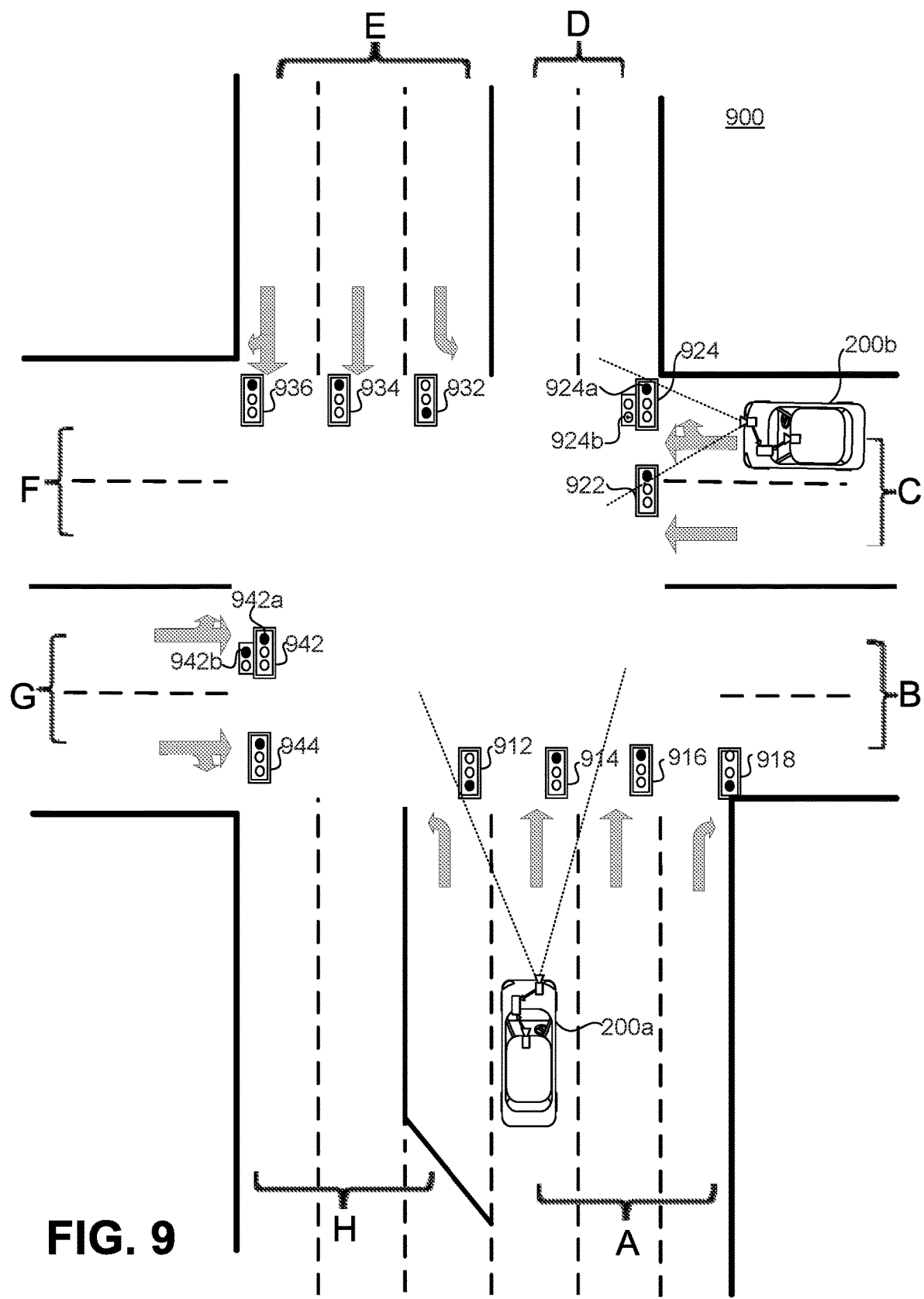
FIG. 9 illustrates examples of traffic light detection consistent with the disclosed embodiments.

Distinguishing between relevant and irrelevant (or less relevant) traffic lights on a road may be complex. FIG. 9 illustrates examples of traffic light detection. In FIG. 9, vehicle 200a is traveling on a multilane road. Each lane of the road is associated with a different traffic light fixture. Vehicle 200a is approaching an intersection and is traveling in a lane designated for proceeding through the intersection and to the opposite side across the intersection. Also shown in FIG. 9, vehicle 200b is traveling in a lane that allows traffic to continue to travel straight and through the intersection or that allows traffic to make a right turn. The traffic light fixture associated with the lane in which vehicle 200b is traveling includes a right-turn traffic light. As another example, in FIG. 21, vehicle 200a reaches a junction of non-perpendicular roads. Multiple traffic light fixtures (e.g., traffic light fixtures 912 and 924), including some that do not regulate the lane in which vehicle 200a is traveling, may be visible to vehicle 200a due to the orientation of the junction.

Returning to FIG. 9, an intersection 900 is shown that has the following driving options: road A has lanes leading to roads B, D, and F; road C has lanes leading to roads D and F; road E has lanes leading to roads F, H, and B; and road G has lanes leading to roads H, B, and D. Road A is associated with four traffic light fixtures 912, 914, 916, and 918. In the situation shown, each traffic light fixture regulates a different lane. Road C is associated with two traffic light fixtures 922 and 924. Traffic light fixture 924 includes a traffic light 924a for continuing straight and a traffic light 924b for right turns (e.g., displaying a green arrow when a right turn is authorized). Road E is associated with three traffic light fixtures 932, 934, and 936. And road G is associated with two traffic light fixtures 942 and 944. Traffic light fixture 942 includes a traffic light 942a for continuing straight and a traffic light 942b for left turns. In the situation illustrated in FIG. 9, traffic light 924b and traffic light fixtures 912, 918, and 932 display green lights while all the other traffic light fixtures display red lights. Of course, many other road variations and relative traffic light configurations may exist in addition to those shown in FIG. 9.

In the situation illustrated in FIG. 9, vehicle 200a is located on road A in a lane that continues straight through intersection 900 to road D. However, the field-of-view of an image capture device included in vehicle 200a may include both traffic light fixtures 912 and traffic light fixture 914 (or even additional fixtures). Vehicle 200a arrived at intersection 900 when both traffic light fixtures 912 and 914 displayed red lights, and only recently the light in traffic light fixture 912 has turned green. In this situation, it is important that the traffic light detection system 100 of vehicle 200a recognizes that the green light of fixture 912 is not applicable to vehicle 200a. Rather, system 100 should base any determined system response (including warning to driver and other navigational response) on the status of the traffic light associated with the more relevant fixture 914.

In another aspect of the situation illustrated in FIG. 9, vehicle 200b is located on road C in a lane that continues straight through intersection 900 to road F, and that lane also allows traffic to make a right turn to road D. Vehicle 200b faces traffic light fixture 924 that includes a traffic light 924a for continuing straight and a traffic light 924b for right turns.

Vehicle 200b arrived at intersection 900 when traffic light fixture 924 displayed red lights for continuing straight (traffic light 924a) and for right turns (traffic light 924b), and only recently traffic light 924b has turned green. This means that the current status of traffic light fixture 924 prohibits traffic from driving straight and turning right. An undesirable situation might occur if vehicle 200b acts on the status of light 924b without recognizing and accounting for the status of light 924a. For example, if vehicle 200b drives to road F (i.e., drives straight) based on the information of traffic light 924b (showing a green light), vehicles driving from road E to road B may create a hazard for vehicle 200b.

The situations depicted in FIG. 9 provide just a few examples of road situations in which it may be desirable to have a system that can distinguish between relevant and irrelevant traffic light fixtures, to determine the status of the traffic lights included in the relevant traffic light fixture(s), and to cause vehicle 200 to take an appropriate system response based on the status and relevancy determination. Further, these examples demonstrate that the system may need to evaluate multiple traffic light fixtures that may face a vehicle in order to identify the traffic light fixture that is most applicable to the lane in which the vehicle is traveling or to the intended travel direction of the vehicle (especially where, for example, multiple traffic lights or traffic light fixtures may be associated with a single lane in which the vehicle is traveling).

As discussed above, system 100 may distinguish between relevant and irrelevant traffic light fixtures, determine the status of the traffic lights included in the relevant traffic light fixture(s), and cause vehicle 200 to take an appropriate system response based on the status and relevancy determination in various driving scenarios. For example, as vehicle 200 (e.g., 200a or 200b) approaches an intersection, system 100 may determine which traffic light is relevant, determine a status of that traffic light, and find any other relevant information in images captured by one or more of image capture devices 122-126. If the traffic light is red, system 100 may cause vehicle 200 to apply its brakes. If the traffic light is green, system 100 may cause vehicle 200 to continue. If the traffic light is yellow, system 100 may determine a distance to the intersection and/or an estimate time to the intersection based on analysis of images, the speed of vehicle 200, and/or positional data (e.g., GPS data).

If vehicle 200 is within a predetermined time (e.g., five seconds, ten seconds, etc.) and/or distance (e.g., one meter, five meters, ten meters, etc.) threshold, system 100 may cause vehicle 200 to continue to pass the intersection (e.g., by maintaining the current speed and direction or by accelerating). If vehicle 200 is not within the predetermined time threshold and/or distance threshold, system 100 may cause vehicle 200 to stop before entering the intersection. As another example, when vehicle 200 is stopped at a traffic light, after the traffic light changes its status from red to green, system 100 may cause a navigational response that includes applying the accelerator, releasing the brakes, and steering through an intersection, for example.

As described above, traffic light detection module 810 may detect traffic light from one or more images captured by a camera, and may determine the relevancy of the detected traffic light to the lane in which vehicle 200 is traveling. For example processing unit 110 may determine the relevancy of each of the plurality of traffic light fixtures (or traffic lights) captured within one or more images to vehicle 200.

For purposes of this disclosure, determining the relevancy of traffic light fixtures may include executing one or more assessments. In one embodiment, processing unit 110 may assess an orientation of each of a plurality of traffic light fixtures with respect to vehicle 200. For example, in the situation illustrated in FIG. 9 the field-of-view (indicated by the dotted lines) of a camera installed on vehicle 200a includes both traffic light fixture 912 and traffic light fixture 914. However, traffic light fixture 912 may appear farther away from a center axis of the camera installed on vehicle 200a than traffic light fixture 914 (e.g., an angle between traffic light fixture 912 and center axis of the camera may be greater than an angle between traffic light fixture 914 and the center axis). The orientation (such as the angle) related to traffic light fixture 914 suggests that traffic light fixture 914 is more relevant to vehicle 200a than fixture 912.

Other assessments may be applicable to the decision making process. For example, processing unit 110 may assess the distance of each of the plurality of traffic light fixtures with respect to the vehicle. For example, processing unit 110 may execute instructions installed within distance determination module 815 to assess the distance between the vehicle and each traffic light fixture. Processing unit 110 may determine that a closest traffic light fixture (e.g., having the smallest distance to the vehicle) is the most relevant to the vehicle. Additionally or alternatively, processing unit 110 may assess which traffic light is facing a front portion of vehicle 200.

Additionally or alternatively, processing unit 110 may use the identified lane markers to divide the area forward of vehicle 200 to a plurality of zones, associate each identified traffic light fixture with a zone, and assess which zone is the most relevant for vehicle 200. Additionally or alternatively, processing unit 110 may compare a vehicle location that was acquired via GPS or any other mapping or localization information and associated technology such as Road Experience Management technology, to map data to determine the relevancy of the traffic light. For example, vehicle 200 may access map data that includes information about the possible driving options at a number of locations. By using the GPS acquired vehicle location, processing unit 110 may determine which driving options are available to vehicle 200 approaching a junction, and use this information to determine the relevancy of the traffic lights at the junction to vehicle 200.

In one embodiment, traffic light detection module 810 may store software instructions which, when executed by processing unit 110, determine a status of a traffic light included in at least one traffic light determined to be relevant to the vehicle. As described above, the status of the traffic light may be also associated with the information the traffic light provides. In a typical traffic light, the color being displayed and the relative location of the illuminated traffic light may provide basic information relevant to vehicle 200.

Traffic light detection module 810 may derive additional information from the environment of the relevant traffic light fixture and from non-typical traffic light included in the relevant traffic light fixture. For example, the relevant traffic light fixture may have in its proximity a sign that includes relevant text, e.g., a sign stating specific days and hours. Accordingly, in some embodiments, traffic light detection module 810 may derive information from the text included in signs associated with the relevant traffic fixture. For example, traffic light detection module 810 may implement optical character recognition techniques to recognize text in the signs. Traffic light detection module 810 may then compare the recognized text to a database to determine the information provided by the sign.

The location of the traffic light fixtures in a junction can be before, after, or in the middle of the junction. Identifying the position of each traffic light fixture in the junction may be used, for example, to determine the relevancy of the traffic light fixtures. In some embodiments, processing unit 110 may estimate the distance of one or more traffic light fixtures with respect to vehicle 200 to create a 3D model of a junction. In one embodiment, the 3D model of the junction may be stored for future usage. The 3D model of the junction may include one or more of the following: a 3D position for one or more traffic light fixtures, the relative distance between each traffic light fixture and other traffic light fixtures in the junction, the direction(s) each traffic light fixture refers to, and the relative distance between each traffic light fixture and the stop line of the junction.

In addition, the 3D model may be periodically updated using details recognizable when vehicle 200 approaches the junction. Examples of the recognizable details may include arrows in traffic lights, the lane marking near or in the junction, etc. In one example, when time vehicle 200 passes the junction, recognized details are compared to the information stored in the 3D model, and if appropriate, the 3D model is updated.

Consistent with embodiments of the present disclosure, the 3D model may be used to determine the relevancy of one or more traffic light fixtures. In order to activate braking system 230 with sufficient time to stop vehicle 200 before the junction, system 100 may determine which traffic light is relevant to vehicle 200 at a distance of about sixty to eighty meters from the junction. As vehicle 200 approaches a junction, information derived from the captured images may be compared to the 3D model to find a match. For example, processing unit 110 may compare the relative distance between recognized traffic light fixtures in the junction to the 3D model to determine the relevancy of one or more traffic light fixtures.

Using the 3D model, processing unit 110 may identify a relevant traffic light when vehicle 200 is more than a predetermined distance (e.g., 50 meters, 75 meters, 100 meters, or 125 meters) from the junction. As another example, processing unit 110 may compare the relative distance between recognized traffic light fixtures in the junction to the 3D model to determine the distance to the junction's stop line, even when the stop line is not visible from the current location of vehicle 200. Using the 3D model, processing unit 110 may determine the distance to the junction's stop line when vehicle 200 is more than the predetermined distance (e.g., 50 meters, 75 meters, 100 meters, or 125 meters) from the junction.

As discussed above with reference to FIG. 8, processing unit 110 may identify traffic lights in at least one acquired image of an area forward of vehicle 200. For example, processing unit 110 may filter objects identified in the at least one acquired image to construct a set of candidate objects, excluding those objects unlikely to correspond to traffic lights. The filtering may be done based on various properties associated with traffic lights, such as shape, dimensions, texture, position (e.g., relative to vehicle 200), and the like.

In addition, processing unit 110 may analyze the geometry of the area forward of vehicle 200. The analysis may be based on any combination of: (i) the number of lanes detected on either side of vehicle 200, (ii) markings (such as arrow marks) detected on the road, and (iii) descriptions of the area extracted from map data. For example, if lane markings defining a lane of travel are recognized on a road, and a traffic light fixture is within the boundaries of the lane markings, system 100 may conclude that the traffic light fixture is associated with the lane associated with the lane markings.

In some embodiments, processing unit 110 may determine at least one indicator of vehicle position from the images. An "indicator of vehicle position" includes any form of information related to the physical location of a vehicle. The indicator of vehicle position may be derived from analyzing the image data (e.g., the at least one acquired image). Additionally, the indicator of vehicle position may be derived from geographic position data (e.g., GPS signals, local positioning signals, and/or map data) or from data indicative of the position of vehicle 200 relative to other vehicles on the road.

In some embodiments, the indicator of vehicle position may include the distance to at least one traffic light fixture derived from the at least one image. In other embodiments, the at least one indicator of vehicle position may include a lane marker recognized based on analysis of the at least one image. For example, processing unit 110 may conduct an analysis using information derived from the at least one image to identify one or more lane markers. Using the identified lane markers, processing unit 110 may determine a correspondence between the detected traffic lights and the lane vehicle 200 is currently driving.

In some embodiments, processing unit 110 may use the at least one indicator of the vehicle position to determine the relevancy of each of the plurality of traffic light fixtures to vehicle 200. In some embodiments, processing unit 110 may rank the relevancy of the traffic light fixtures identified in the at least one acquired image. The traffic light fixture having the highest value of relevancy ranking may be determined to be the relevant traffic light fixture. For example, in the situation illustrated in FIG. 9 the field-of-view of image capture device 122 includes both traffic light fixture 912 and traffic light fixture 914, but by using one or more assessments, processing unit 110 may determine that traffic light fixture 914 has a higher relevancy ranking value.

One way for processing unit 110 to determine that traffic light fixture 914 has a higher relevancy ranking than traffic light fixture 912 is by assessing the distance of each of the plurality of traffic light fixtures with respect to vehicle 200*a*. For example, in the situation depicted in FIG. 9, traffic light fixture 914 is closer than traffic light fixture 912. Thus, traffic light fixture 914 is more likely to be relevant than traffic light fixture 912.

In some embodiments, the relevancy determination of each of the plurality of traffic light fixtures to vehicle 200 may include a preliminary examination to eliminate improbable traffic light fixtures. For example, when the at least one acquired image includes three close traffic light fixtures and two distant traffic light fixtures, the two distant traffic light fixtures may be classified as improbable to be relevant to vehicle 200. By eliminating improbable traffic light fixtures and ranking the relevancy of a subject of the traffic light fixtures identified in the at least one acquired image, processing unit 110 may save processing power.

In some embodiments, the relevancy ranking may change when vehicle 200 approaches the junction. For instance, the orientation of the traffic light fixture may change from different points on the road, thus, the distance to the junction may impact the probability that a given traffic light fixture is relevant to vehicle 200. Accordingly, the relevancy ranking may be associated with a confidence level, which may take into account factors, such as distance to a junction, when assessing traffic light fixtures. Further, processing unit 110 may periodically or constantly update the relevancy ranking of the traffic light fixtures when the confidence level is below a certain predetermined threshold.

Traffic light detection module 810 may further use navigation information previously stored within system 100, such as within memory 140/150, in order to determine a traffic light relevant to vehicle 200. Based on a determined 3D position of vehicle 200 and/or image capture devices 122-126 as discussed above, traffic light detection module 810 may perform a registration between navigational map data and vehicle 200. Based on the determination of relative distance measurements as described above, traffic light detection module 810 may use the navigational map data to determine the point in 3D space at which vehicle 200 (via braking system 230) should brake in order to stop at each detected traffic light fixture at the junction. According to the 3D registration result, traffic light detection module 810 may determine a lane assignment for each traffic light detected at the intersection using the navigational map data. Traffic light detection module 810 may then determine the lane assignments within system 100 and image processor 190, then perform the registration.

Processing unit 110 (e.g., via traffic light detection module 810) may determine, based on the at least one acquired image, a status of a traffic light included in at least one traffic light fixture determined to be relevant to vehicle 200. In some cases, the relevant traffic light fixture may include a plurality of illuminated traffic lights, and the status of each traffic light may depend on the type of the traffic light. In one embodiment, the status of a traffic light means simply the color it indicates, e.g., green, yellow, and red. System 100 may identify the status of a traffic light using a variety of techniques. For example, system 100 may identify an area of one or more images that include a traffic light and perform an analysis of the pixels in the area to determine the colors of the pixels. After analyzing at least a threshold number of pixels (e.g., two pixels, ten pixels, twenty pixels, etc.) in the area, system 100 may, for example, determine the color of the traffic light by finding an average value of the pixels in the area.

Additionally or alternatively, the status of the traffic light may include the direction the traffic light refers to. In a typical traffic light, a green color indicates that vehicle 200 is allowed to proceed. However, sometimes this information by itself is insufficient to decide whether it is safe to drive in a certain direction, such as when a green light only authorizes a turn. One way to determine which direction the traffic light refers to includes accessing a database that correlates each traffic light with one or more directions.

Another way includes identifying, from the image data, the type of the traffic light and determining from the contextual situation the direction the traffic light refers to. For example, in the second situation depicted in FIG. 9 relative to vehicle 200*b*, traffic light fixture 924 may be determined as the relevant traffic fixture, but traffic light fixture 924 includes two illuminated traffic lights 924*a* and 924*b*. Accordingly, processing unit 110 may determine that the status of traffic light 924*a* is a red light for continuing straight, and the status of traffic light 924*b* is a green light for turning right. In some embodiments, the determination of the status of the traffic light includes one or more of determining a location of the traffic light within a relevant traffic light, determining whether the traffic light is illuminated, determining a color of the traffic light, and determining whether the traffic light includes an arrow. In some embodiments, the traffic light may not include an arrow in itself, but there may be an auxiliary light or sign that is disposed adjacent (e.g., above or next to) the traffic light to indicate (e.g., with arrows) the direction to which the traffic light applies. Processing unit 110 may detect the traffic light and the auxiliary light or sign to determine whether the traffic light is green and the direction of the traffic light. In some embodiments, processing unit 110 may detect markings (e.g., arrows or words) on the surface of the road that indicate the direction of a respective lane and to which the respective traffic light applies. Processing unit 110 may determine the status and direction of the traffic light based on analysis of the image of the traffic light and the image of the markings on the road surface.

Processing unit 110 (e.g., via traffic light detection module 810) may cause a system response based on the determined status. In some embodiments, processing unit 110 may cause one or more system responses (e.g., two or more responses), including responses of different types. One type of system response may include navigational responses, the navigational response may include, for example, starting to drive, a change in acceleration, a change in velocity, applying vehicle brakes, discontinuing cruise control, and the like. For example, these system responses may include providing control signals to one or more of throttling system 220, braking system 230, and steering system 240 to navigate vehicle 200.

Another type of system response may include initiating a timer and/or incrementing a counter in order to provide statistical information about one or more driving sessions to the driver of vehicle 200. For example, the statistical information may indicate how many times vehicle 200 has encountered red lights in a driving session, and/or the duration of a driving session that vehicle 200 spent waiting at red lights.

Another type of system response may include providing various notifications (e.g., warnings and/or alerts) to the driver of vehicle 200. The warnings and/or alerts may include, for example, announcing the color of a relevant traffic light and/or a distance to a junction. The notifications may be provided via speakers 360 or via an associated display (e.g., touch screen 320).

System 100 may detect that a vehicle, such as vehicle 200, is traveling in a turn lane. A "lane" may refer to a designated or intended travel path of a vehicle and may have marked (e.g., lines on a road) or unmarked boundaries (e.g., an edge of a road, a road barrier, guard rail, parked vehicles, etc.), or constraints. System 100 may operate to make these detections and determinations based on visual information acquired via one or more image capture devices, for example. In some embodiments, these detections and determinations may also be made at least in part on map data and/or sensed vehicle position. In addition to determining the status of vehicle 200 as being in a turn lane, system 100 may recognize a traffic light associated with the lane, and may be configured to determine the status of the traffic light based on analysis of road context information and determined characteristics of the traffic light.

Figure 10:
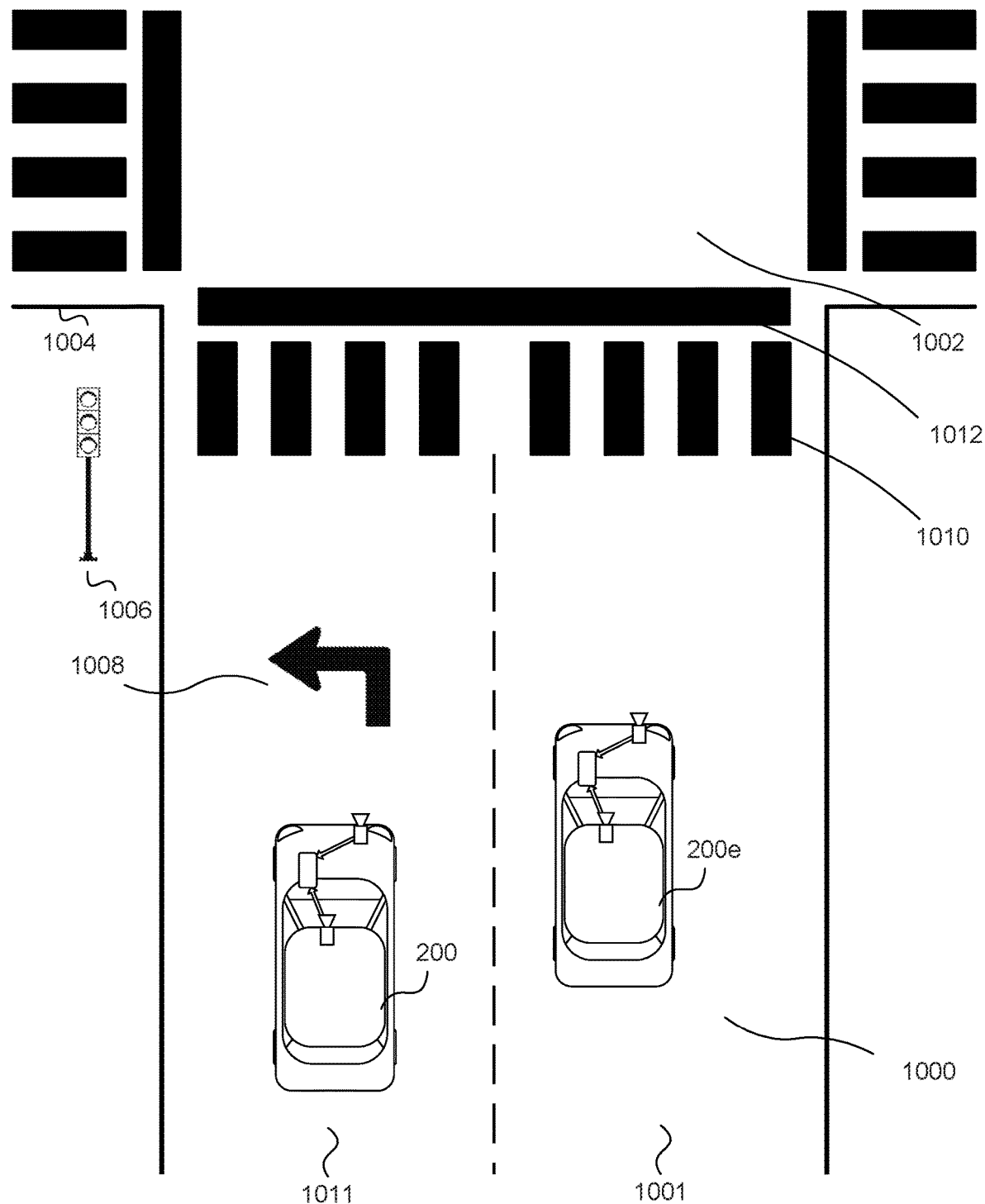
FIG. 10 illustrates a further example of traffic light detection consistent with the disclosed embodiments.

FIG. 10 illustrates a further example of traffic light detection. FIG. 10 shows a vehicle 200 traveling on a roadway 1000 in which the disclosed systems and methods for detecting an object in the roadway may be used. Vehicle 200 is depicted as being equipped with image capture devices 122 and 124; more or fewer cameras may be employed on any particular vehicle 200. As shown, roadway 1000 may be subdivided into lanes, such as lanes 1001 and 1011. Lanes 1001 and 1011 are shown as examples; a given roadway 1000 may have additional lanes based on the size and nature of the roadway. In the example of FIG. 10, vehicle 200 is traveling in lane 1011 and vehicle 200e is traveling in land 1001, and both vehicles 200 and 200e are approaching intersection 1002. Traffic in lane 1011 and lane 1001 at intersection 1002 is regulated by traffic light fixture 1006. System 100 may, as discussed in detail below, determine the status of traffic light fixture 1006 and cause a system response affecting operations of vehicle 200. Further illustrated on roadway 1000 are warning lines 1010 (or pedestrian crossing lines 1010) leading to a stop line 1012. In some embodiments, stop line 1012 may be in front of warning lines 1010 (i.e., on the other side of warning lines 1010 closer to the vehicles shown in FIG. 11)

Processing unit 110 may be configured to determine one or more lane constraints associated with each of lanes 1001 and 1011 and intersection 1002 based on a plurality of images acquired by one or more of image capture device 122-126 that processing unit 110 may receive via data interface 128. According to some embodiments, the lane constraints may be identified by visible lane boundaries, such as dashed or solid lines marked on a road surface. Additionally or alternatively, the lane constraints may include an edge of a road surface or a barrier. Additionally or alternatively, the lane constraints may include markers (e.g., Botts' dots). According to some embodiments, processing unit 110 may determine constraints associated with lanes 1001/1011 and/or intersection 1002 by identifying a midpoint of a road surface width, such as the entirety of roadway 1000 or intersection 1002 or a midpoint of one of lanes 1001/1011. Processing unit 110 may identify lane constraints in alternative manners, such as by estimation or extrapolation based on known roadway parameters when, for example, lines designating road lanes such as lanes 1001/1011 are not painted or otherwise labeled. Processing unit 110 may also determine the physical relative distance between the various constraints and detected objects, such as traffic light lights.

Distance estimation for a junction with traffic lights may be challenging when developing autonomous vehicle or red traffic light warning systems, because the location of the traffic light may be after or in the middle of the junction. For example, determining the 3D position for each traffic light at an intersection may imply a braking point for the vehicle and the stop line may provide an accurate position.

In the present system, detection of the constraints and pathways of roadway 1000, cross street 1004, or intersection 1002, as well as constituent lanes 1001/1011 may include processing unit 110 determining their 3D models via a camera coordinate system. For example, the 3D models of lanes 1001/1011 may be described by a third-degree polynomial. In addition to 3D modeling of travel lanes, processing unit 110 may perform multi-frame estimation of host motion parameters, such as the speed, yaw and pitch rates, and acceleration of vehicle 200. Processing unit 110 may further determine a road elevation model to transform the information acquired from the plurality of images into 3D space.

One feature of the present system is that a global model may be created for static objects at a traffic intersection simultaneously rather than creating one standalone model for every detected object. System 100 may thus be configured to determine absolute distances for objects or lane constraints at a distance, for example, within about one hundred meters. In some cases, system 100 may be configured to determine absolute distances for objects or lane constraints at other distances (e.g., within 125 meters, within 150 meters, etc.). Further, system 100 may be configured to determine which traffic light fixture (e.g., traffic light fixture

1006) is relevant to vehicle 200 within a distance of about sixty to eighty meters from stop line 1012.

Accurate distance estimation to the intersection (e.g., to the traffic lights at the intersection and/or stop line) may be achieved through processes referred to as expansion and scaling. The expansion process may use relative distances to determine a distance from vehicle 200 to an object, such as stop line 1012. For example, if two traffic light fixtures are detected in the image data, and the distance between them increases by 5% when the vehicle moves a distance of ten meters, then the system calculates that the distance is 200 meters.

In some embodiments, traffic light detection module 810 may store instructions which, when executed by processing unit 110, may detect the presence and status of a traffic light fixture, such as traffic light fixture 1006. Traffic light detection module 810, along with image processor 190, may perform image processing on one or more images acquired by one or more of image capture devices 122-126. Traffic light detection module 810 may further determine the status of traffic light fixture 1006, including a determination of whether one of the lights within traffic light fixture 1006 includes an arrow.

Traffic light detection module 810 may determine other information relevant to the status of traffic light fixture 1006, including but not limited to whether any of the traffic lights associated within traffic light fixture 1006 are illuminated (in either a solid or blinking manner), determining positions of the traffic lights within the traffic light fixture (i.e. a horizontal orientation of traffic lights versus a vertical orientation), or determining a color associated with the traffic light. In some embodiments, traffic light detection module 810 may store information determined for a particular heading, a particular intersection 1002, and/or a particular traffic light fixture 1006 within a storage device, such as in memory 140/150. In these embodiments, previously determined and saved information may be used in the future when vehicle 200 returns to the same intersection.

In some embodiments, a blinking traffic light may be determined through image analysis of multiple images acquired at a predetermined or known capture rate (e.g., analyzing images acquired 1 second, 1.5 seconds, 2 seconds, etc., apart). For example, system 100 may analyze image data to identify a pattern in illumination among a plurality of images. System 100 may further determine a region of a captured image determined to be within the boundaries of a particular traffic light of interest in a traffic light fixture. System 100 may then determine the color of a traffic light through pixel analysis in the region determined to be within the boundaries of the traffic light of interest.

Processing unit 110 may determine a position of vehicle 200. In some embodiments, determining the position of vehicle 200 may include determining at least one indicator of vehicle position, either via a visual determination or through analysis of the at least one image received from image capture devices 122-126 via data interface 128. In these embodiments, the at least one indicator of vehicle position may include a distance from the vehicle to one or more lane constraints or lane markers associated with the current lane in which the vehicle is traveling, or to markers associated with an intersection, such as warning lines 1010 and stop line 1012.

The distance from the vehicle to a location or object may be determined based on, for example, one or more of an analysis of image data, GPS information, or data from a position sensor. Further, the at least one indicator of vehicle position may include an arrow associated with the traffic light fixture having at least one associated traffic light. Additionally or alternatively, the at least one indicator of vehicle position may include a vehicle location acquired by GPS or a like coordinate system. In some embodiments, memory 140 and/or 150 may store lane constraint information determined for a particular roadway 1000 and its lanes 1001/1011. In these embodiments, previously determined and saved information may be used in the future when vehicle 200 returns to the same intersection. For example, GPS information may be used to determine that vehicle 200 has returned to the same intersection.

Consistent with disclosed embodiments, processing unit 110 may use the information from the at least one indicator of vehicle position to determine if a system response changing the operation of vehicle 200 is required or recommended. Additionally or alternatively, processing unit 110 may receive information from other sensors (including position sensor 130) or other systems indicative of the presence of other features in the image data, such as additional vehicles, curvature of the road, etc.

Processing unit 110 may take one or more actions relative to the operation of vehicle 200 based on information received from one or more sources, such as position sensor 130, image processor 190, or traffic light detection module 810. In some embodiments, traffic light detection module 810 may provide information regarding the status of a traffic light at an intersection, such as traffic light fixture 1006 at intersection 1002 discussed above. In some embodiments, image analysis module 805 may provide a determination of whether the vehicle is in a turn lane, and whether the traffic light fixture 2406 includes an arrow. Image analysis module 805 may detect turn lane or arrow based on analysis of images captured by one or more cameras.

Processing unit 110 may cause a system response affecting the operational status of vehicle 200, such as causing system 100 to provide control signals to one or more of throttling system 220, braking system 230, and steering system 240 to navigate vehicle 200 (e.g., by accelerating, turning, etc.). For example, in some embodiments, system 100 may determine that the turn lane traffic light authorizes vehicle 200 to make a turn. In these embodiments, system response module 830 may send an instruction to steering system 240, and steering system 240 may execute the instruction to turn vehicle 200 through intersection 1002 into a new lane of travel associated with cross street 1004. In other embodiments, the system response initiated and executed by system response module 830 may include any or all of providing a visual or audible notice to the operator of the vehicle, applying vehicle brakes, discontinuing a cruise control function, or initiating one or more automated turning maneuvers.

Additionally or alternatively, system response module 830 may send instructions to other systems associated with vehicle 200, such as braking system 230, turn signals, throttling system 220, etc. In some embodiments, system response module 830 may instead provide a human operator (i.e., driver) of the vehicle with audio, visual, or tactile feedback representative of the information gathered from the relevant systems and/or sensors. The human operator may then act on this feedback to turn the vehicle.

Figure 11:
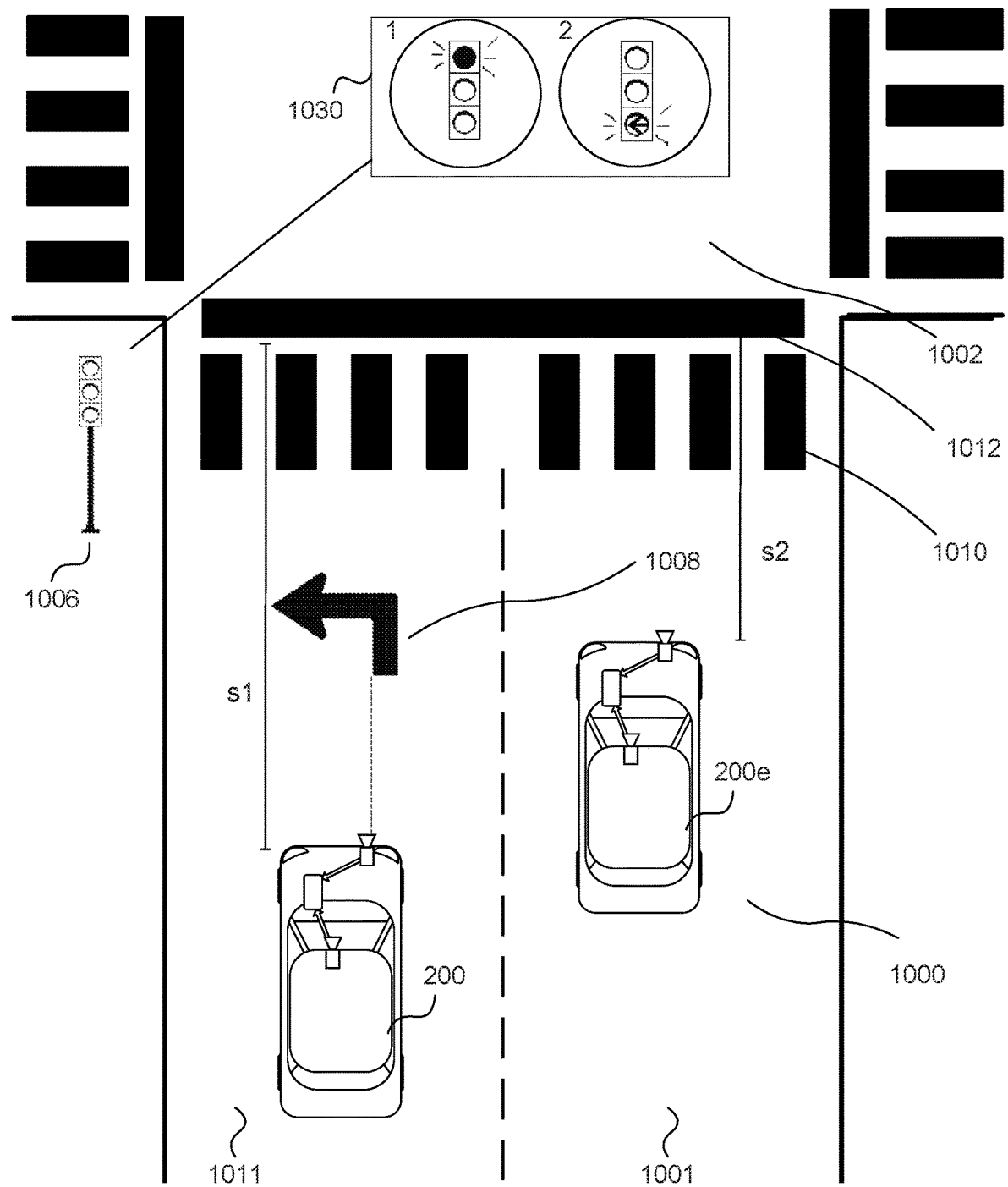
FIG. 11 provides an annotated view of the situation depicted in FIG. 10.

FIG. 11 provides an annotated view of the situation depicted in FIG. 10. Vehicle 200 is once again traveling in lane 1011 of roadway 1000, and is approaching intersection 1002. Vehicle 200 is again equipped with image capture devices 122 and 124, although more or fewer devices may be associated with any particular vehicle 200. For simplicity of illustration, roadway 1000 in FIG. 11 is depicted as a one-way street oriented from the top to the bottom of the page with two travel lanes 1001 and 1011.

To the left side of roadway 1000 at intersection 1002 is traffic light fixture 1006. Painted on the surface of lane 1011 in front of vehicle 200 is a lane arrow 1008, indicating that lane 1011 is a left turn lane. Also painted or otherwise affixed on the surface of roadway 1000 are warning lines 1010 leading to stop line 1012.

Consistent with disclosed embodiments, system 100 may be configured to determine whether vehicle 200's travel lane approaching an intersection (here, lane 1011) is a turn lane; determine whether a traffic light fixture (here, traffic light fixture 1006) regulates the intersection; determine the status of a traffic light in the traffic light fixture; and determine whether that traffic light includes an arrow.

System 100 associated with vehicle 200 may determine the position of vehicle 200 within roadway 1000 via one or more of processing unit 110, position sensor 130, traffic light detection module 810. Additionally or alternatively, system 100 may gather information from at least one indicator of vehicle position. As discussed above, the at least one indicator of vehicle position may include a distance from vehicle 200 to one or more lane constraints or lane markers associated with the current lane in which the vehicle is traveling (such as lane 1011), or to markers associated with an intersection 1002, such as warning lines 1010 and stop line 1012. Further, the at least one indicator of vehicle position may include an arrow associated with traffic light fixture 1006. Additionally or alternatively, the at least one indicator of vehicle position may include a vehicle location acquired by GPS or a like coordinate system.

In the illustration of FIG. 11, multiple indicators of the position of vehicle 200 are present. One or more of image capture devices 122-126 associated with vehicle 200 may be configured to capture a plurality of images of the area in front of vehicle 200 that may assist in determining a position of vehicle 200. For example, the images may include lane arrow 1008, which indicates that lane 1011 is a left turn lane for intersection 1002. The images may also include traffic light fixture 1006, and may indicate that one or more of the individual lights within traffic light fixture 1006 includes an arrow suggestive of a turn lane situation. One or more of image capture devices 122-126 may further capture images of warning lines 1010 or stop lines 1012 associated with either roadway 1000 or cross street 1004.

Further, system 100 via processing unit 110 may determine a position of vehicle 200 within the turn lane by determining a distance s1 from a surface of vehicle 200 to stop line 1012, or s2 from a surface of vehicle 200e to stop line 1012. Distance determination module 815 may store instructions that may be executed by processing unit 110 to determine the distances s1 and/or s2. Still further, system 100 may implement an optical character recognition (OCR) process to obtain text included in one or more captured images (e.g., text from signs and/or road markings). System 100 may then use the text information as part of or as the basis of determining whether vehicle 200 is within a turn lane. For example, system 100 may identify certain words indicative of a turn lane (e.g., "turn, "right," left," etc.).

Determining the distance s1 or s2 may be based on direct measurements of distance, such as via position sensor 130, or may be based on analysis of captured image data by image processor 190 and may be used in connection with map data. The distance may be measured from any portion of the interior or exterior vehicle 200 or 200e, including but not limited to the front of vehicle 200 or 200e, a portion of vehicle 200 or 200e such as a headlight or front license plate, a position as-installed of image capture devices 122-126, a determined centroid of vehicle 200 or 200e, the rear of vehicle 200 or 200e, one or more windshields or mirrors associated with vehicle 200 or 200e, wheels of vehicle 200 or 200e, right or left sides or windows of vehicle 200 or 200e, a point associated with the roof of vehicle 200 or 200e, or a point associated with the chassis of vehicle 200 or 200e.

In some embodiments, determining the distance from vehicle 200 or 200e to traffic light fixture 1006 may be sufficient to assist processing unit 110 in calculating a braking distance or other such measurement. In other embodiments, however, traffic light fixture 1006 may be located past the point at which vehicle 200 would be required to stop. In these embodiments, the distance to the intersection may be determined by using one or more of warning lines 1010 or stop line 1012.

As discussed above in association with FIG. 10, these distances may be calculated using an estimation process employing expansion and scaling. At an intersection 1002 with two traffic light fixtures, for example, system 100 may measure the relative distance between the two fixtures over a period of time as captured in the image data, and then use that relative distance to estimate the distance to stop line 1012. In some embodiments, these measurements may be repeated over time for increased precision. Precision may also be increased by other methods. For example, if three or four traffic light fixtures are situated at intersection 1002, relative distances may be calculated between each of the fixtures and averaged. Additionally or alternatively, the distance may be estimated using a Kalman filter, as discussed above.

System 100 may still need additional information or inputs to determine the location of a stop line 1012 relative to an intersection 1002 and/or traffic light fixtures 1006. In some embodiments, system 100 may use previously-stored map data gathered from prior trips to the intersection. This information may be received from traffic light detection module 810, or image analysis module 805. A distance measure Z may also be derived from the image data using the equation $$Z = fW/w$$

where W is the known distance between two traffic light fixtures 1006, w is the distance in the image data in pixels, and f is the focal length of the particular image capture device 122-126 in pixels.

In FIG. 11, an inset 1030 shows the two statuses of traffic light fixture 1006 relevant to the example. Based on image data from at least one image received via data interface 128 from image capture devices 122-126, system 100 may be configured to determine the status of traffic light fixture 1006. Upon approaching intersection 1002, system 100 may first determine that traffic light fixture 1006 is displaying a solid red light, as seen in image 1 of inset 1030. In the example of FIG. 11, lane 1011 is a left turn lane, so unless roadway 1000 is located in a jurisdiction where left turns on red are legal, vehicle 200 must stop at stop line 1012 and remain stationary until traffic light fixture 1006 is determined to have changed.

In alternative embodiments (not shown), vehicle 200 may be traveling in a lane that is determined to be a right turn lane, and assuming that right terms on red are legally permissible in that jurisdiction, system 100 may cause a system response enabling vehicle 200 to turn right while traffic light fixture 1006 remains red. Lane 1001 may be a straight ahead only lane. When the traffic light at traffic light fixture 1006 is green, vehicle 200e in lane 1001 may proceed to pass intersection 1002. When the traffic light at traffic light fixture 1006 is yellow, vehicle 200e in lane 1001 may brake to reduce the speed or to stop at stop line 1012, or accelerate to speed up and pass intersection 1002. When the traffic light at traffic light fixture 1006 is red, vehicle 200e must stop before stop line 1012.

Subsequently, as seen in image 2 of inset 1030, traffic light fixture 1006 may shift from a solid red light to a solid green. In some embodiments, the solid green light may also include an arrow indicating a permitted left turn. System 100 may be configured to detect not only that the color of the light has changed, but also that an arrow has appeared within the traffic light based on pixel-level image analysis by image processor 190 of acquired images of traffic light fixture 1006. In some embodiments, in order for system 100 to detect that the color of a traffic light has changed, system 100 may analyze captured images over a period of time (e.g., 1 second, 5 seconds, 10 seconds, 15, seconds, 20 seconds, 30 seconds, 1 minute, etc.) in order to recognize the status change (or transition from one color to another) of the traffic light. System 100 may further determine once traffic light fixture 1006 changes to display the green arrow whether it is safe or authorized to proceed in the direction indicated by the status of the light.

Although not shown, in the example of FIG. 11, as vehicle 200 or 200e approaches intersection 1002, traffic light fixture 1006 may display a flashing or blinking yellow light. As may be familiar to one of ordinary skill in the relevant art, some jurisdictions use blinking yellow lights to essentially serve the same functions as "Yield" or "Stop" signs during certain times of the day, while still permitting the lanes of travel to be fully stopped with a red light or fully authorized to proceed with a green light.

As outlined above, system 100 may determine that traffic light fixture 1006 is displaying a blinking yellow light. As described above, traffic light fixture 1006 may regulate both lanes 1001 and 1011. As one of ordinary skill would understand, a blinking yellow light authorizes an approaching vehicle to turn or proceed straight ahead at will, but only if it is safe to do so. Drivers are expected to use caution at the intersection and determine that no potential collisions or other hazards would result from making the turn too early. Thus, system 100 may provide a warning or alert to a driver of vehicle 200e (regardless of whether vehicle 200e is a conventional vehicle operated by a human driver, or when vehicle 200e is an autonomous vehicle that can be controlled by a human operator). Additionally or alternatively, system 100 may cause vehicle 200e to take a navigational response, such as acceleration, deceleration (e.g., via braking), maintaining the current speed, etc.

One such determination that system 100 may make is whether one or more vehicles are crossing the intersection. For example, while travel lanes traveling in the south-north direction (i.e., the direction in which vehicle 200e is travelling) of a roadway may have a blinking yellow light in an "ahead" lane (in which a vehicle can drive forward ahead), traffic traveling the east-west direction (i.e., the left and right direction of intersection 1002 in the view shown in FIG. 11) may have a green light to proceed straight through the intersection. Accordingly, a collision could occur if the operator of the vehicle with the blinking yellow signal fails to yield to a vehicle that is also crossing the intersection in the east-west direction. If system 100 detects the presence of another vehicle in the intersection or is about to enter the intersection in the east-west direction, via image data captured from one or more of image capture devices 122-126, system 100 may issue a warning or alert to the driver of vehicle 200e, or cause braking system 230 to brake to reduce the speed of vehicle 200e or even to stop before entering the intersection.

System 100 may provide a traffic light warning function configured to alert the driver when the vehicle is about to enter a junction or intersection with a red traffic light indication, or with an indication of changing status from green to red (e.g., a yellow light). For example, system 100 may determine which traffic light is relevant to the vehicle. In some embodiments, system 100 may also determine the severity of the driver's unawareness or awareness to it (e.g., no braking has been taken by the driver within a certain distance to the traffic light or intersection). In cases in which system 100 determines that the driver is not paying attention to the need to stop, system 100 may issue a red traffic light alert to the driver, which may be an audio alert, a visual alert, a tactile alert, or a combination thereof. In some embodiments, system 100 may automatically cause a system response, such as a navigational response by the vehicle, in response to detecting a red traffic light ahead of the vehicle or a transition of the traffic light from green to yellow to red.

In some embodiments, system 100 may determine whether to cause a system response in the vehicle based on at least one of the relevancy of the traffic light, the status of the relevant traffic light, estimate of a distance from the vehicle to a traffic light fixture or a stop line (e.g., s1 and/or s2 in FIG. 11). System 100 may also determine whether one or more alert suppression schemes are satisfied to avoid false alarms.

Traffic lights may be detected from images captured by one or more image capture devices 122-126. As discussed above, traffic light detection module 810 shown in FIG. 8 may store instructions executable by processing unit 110 to detect traffic lights and/or traffic light fixtures, including the status of traffic lights (e.g., color, location, etc.). In some embodiments, processing unit 110 may analyze one or more images to locate and classify traffic lights candidates appearing in the images. Using any one or more of the traffic light detection methods described above, processing unit 110 may identify a bounding rectangle and the color of a traffic light in the image, thereby identifying the traffic light and its status. In some embodiments, processing unit 110 may identify a transition status (e.g., from green to yellow to red) based on the colors of the traffic light captured in a plurality of images (e.g., two or more sequentially acquired images).

After traffic lights are detected from the images, processing unit 110 may execute instructions stored in distance determination module 815 to make one or more measurements related to the traffic lights from the images. For example, processing unit 110 may measure a distance in the physical world from the vehicle to the stop line, the traffic light, or the traffic light fixture to which the traffic light is attached. In some embodiments, processing unit 110 may also measure the lateral distance of the vehicle to a traffic light located on one side of the road. Processing unit 110 may measure the traffic light height measured from the ground. Processing unit 110 may measure the size of the traffic light, such as the height and width of the traffic light.

Processing unit 110 may estimate the distance from the vehicle to the junction (or intersection). In one embodiment, processing unit 110 may detect a stop line at the intersection in the images, and may measure the distance from the vehicle to the stop line (or junction where the stop line is located) in the physical world. The measured distance may be regarded as the distance from the vehicle to the junction (or intersection). In some embodiments, through distance estimation module 815, processing unit 110 may estimate the distance to the junction based on one or more of the traffic lights in the images detected by traffic light detection module 810. In some embodiments, the distance from the vehicle to the traffic lights or traffic light fixtures may be determined based on both the stop line detected in the images and the traffic lights detected in the images.

Since the traffic lights arrangement in the junction may be region dependent, distance estimation module 815 may take into account the region (or location) in which the vehicle is being operated. For example, different algorithms may be executed for United States and Europe.

When determining the distance from the vehicle to the traffic lights (or traffic light fixtures or intersection), processing unit 110 may attempt to cluster the traffic lights detected from the images into two clusters (or rows). If two clusters of traffic lights are detected, processing unit 110 may measure the length of the junction (or intersection). For example, the length of the junction may be measured based on the two clusters of traffic lights (the far and close traffic lights). In some embodiments, the length of the junction may be measured based on the distance between the two clusters of traffic lights in the physical world.

Processing unit 110 may measure distances from the vehicle to one or more of the traffic lights or the distance between the two clusters of traffic lights using any methods known in the art based on one or more images. The distance from the vehicle to the junction may be measured as (the average distance from the vehicle to all of the traffic lights)–(length of the junction). In some embodiments, when a stop line is detected, the distance from the vehicle to the junction measured based on the stop line may be averaged with the distance from the vehicle to the junction measured based on the traffic lights. For example, if the distance from the vehicle to the junction measured based on the stop line is D1, and the distance from the vehicle to the junction measured based on the traffic lights is D2, the overall distance from the vehicle to the junction may be calculated as D0=D1*w1+D2*w2, where w1 and w2 are weights. In some embodiments, weight w1 may be greater than weight w2.

In some embodiment, when a single cluster of traffic lights is detected (e.g., a single row or line of traffic lights), processing unit 110 may determine the traffic light location by a region code. For example, a first region code may designate United States, while a second region code may designate Europe. The region codes may be stored in memory 140 or 150. There may be other region codes for other countries. For example, based on the region code, a predetermined (or default) length of junction may be used. The length of the junction (or intersection) means the span of the junction (or intersection) in the same direction as the driving direction of the vehicle. For example, when the vehicle is passing the junction (or intersection) in the north-south direction (rather than the east-west direction), the length of the junction is the span of the junction in the north-south direction. As another example, based on the region code, a default location of the traffic lights may be assumed (e.g., located at far end of intersection or located at close end of intersection). Processing unit 110 may measure the distance from the vehicle to the junction based on all traffic lights, such as the distances from all traffic lights to the vehicle. In some embodiments, the measurements of the distances (e.g., the distances from the vehicle to the stop line, to the traffic lights, etc.) may be averaged and filtered using, for example, a predict-correct scheme by vehicle ego motion.

When the vehicle is operated in the United States, some traffic lights may not be located near the stopping location (e.g., stop line in front of the junction). In some cases, one or more of the traffic lights at the junction are located on the far side of the junction. Processing unit 110 may first attempt to cluster the traffic lights detected in the images into two clusters or rows (a close cluster and a far cluster). If the detected traffic lights can be clustered into two clusters, processing unit 110 may calculate the length of junction, e.g., based on the distance between the two clusters of traffic lights. If the clustering fails (i.e., traffic lights cannot be clustered into two clusters), all of the traffic lights may be assumed to be located at the far side of the junction. In the case of one single cluster, the length of junction may use a predetermined length of 20 meters (or any other suitable length). Distance from the vehicle to the junction is measured based on the average of all of the distances from all of the traffic lights to the vehicle, and the length of the junction, e.g., (the average of all of the distances from all of the traffic lights to the vehicle)–(length of the junction).

When the vehicle is operated in Europe, the traffic lights may typically be located at the stopping location of the vehicle (e.g., near the stop line). Processing unit 110 may attempt to cluster the detected traffic lights into two clusters (e.g., close and far clusters). In case of clustering success, processing unit 110 may calculate the length of the junction, e.g., by the distance between the two clusters of traffic lights. In case of clustering failure (e.g., only one cluster is detected), all of the traffic lights may be assumed to be located at the close side of the junction. The distance from the vehicle to the junction may be measured based on the average of the distances from all of the traffic lights to the vehicle and the length of the junction, e.g., (the average of all of the distances from all of the traffic lights to the vehicle)–(length of the junction). If a stop line is also detected in the images, the same average discussed above using weights w1 and w2 may be performed, i.e., D0=D1*w1+D2*w2, where D1 is the distance measured based on the detected stop line, and D2 is the distance measured based on the clustering of traffic lights. However, in the case of Europe, the weight w1 may be smaller than the weight w1 used in the case of United States.

Through traffic light detection module 810, processing unit 110 may determine the relevancy of a traffic light to the vehicle. For example processing unit 110 may find the most relevant traffic light in the scene from all of the traffic lights captured in the images using one or more of the methods described above. Processing unit 110 may use information from one or more of the traffic lights and information from the at least a portion of a scene captured in the images. For example, an input into an algorithm for determining the relevancy of a traffic light may include traffic light 3D location (x, y, z), road information, and Spot's super-resolution information (e.g., for arrow, circular shapes related to the traffic light). An output of the algorithm may be a relevancy score for each traffic light. The one with the highest score may be the most relevant traffic light.

Through traffic light detection module 810, processing unit 110 may determine various features for each traffic light detected in the images. For example, processing unit 110 may determine the distance from the center of a road model to the traffic light, a super resolution score (e.g., for arrow and/or circular shapes), age, and location in the real world. In some embodiments, processing unit 110 may classify the features using an internal module for a relevancy score. The traffic light with the highest relevancy score may be marked as the most relevant traffic light for the vehicle. Traffic lights with high distance from the junction (as calculated by distance determination module 815) may be automatically filtered and treated as irrelevant (e.g., being assigned low relevancy scores).

In some embodiments, the relevancy score may be determined based on the angle of the traffic light relative to the lane in which vehicle 200 is traveling. When the angle is within a predetermined range of angles (e.g., −15 degrees to 15 degrees), the score may be assigned with a high value; otherwise, the score may be assigned with a low value. Other scoring schemes may also be used. For example, processing unit 110 may select one of the traffic lights that best fits the lane in which the vehicle is travelling based on the smallest angle associated with the traffic lights. In some embodiments, prior information regarding the junction layout and the layout of the traffic lights in that junction may be stored in a memory, and that information may be used to match the visual information obtain in the captured images of the traffic lights and/or junction. A matching score for the different traffic lights included in the captured images may be calculated. The traffic light having the highest matching score may be deemed as most relevant to the lane in which the vehicle is travelling.

System 100 may cause a system response in the vehicle when one or more conditions or criteria are satisfied based on an assessment of information derived from the captured images. For example, processing unit 110 may determine whether the vehicle is approaching a red relevant traffic light. Processing unit 110 may determine whether a traffic light is detected from the captured images and determine the status of the traffic light. For example, based on analysis of one or more captured images including the traffic lights, processing unit 110 may determine whether the detected traffic light is red, yellow, or is transitioning from green to yellow (and soon will be transitioning to red). When processing unit 110 determines that one or more conditions are satisfied, and the vehicle is approaching a red light (a yellow light, or a green light that is transitioning to a yellow light), processing unit 110 may cause a system response. The system response may include an alert or warning notification to the driver of the vehicle. In some embodiments, the system response may include an acceleration (to pass the intersection more quickly), a braking (to reduce the speed or to stop before the intersection), or maintaining the current speed (to safely pass the intersection).

The one or more conditions or criteria for triggering a system response may include a TTC based condition, a minimum deceleration based condition, or both. To trigger a system response based on the TTC condition, processing unit 110 may determine, for each time frame (e.g., 9 fps), the current TTC for the vehicle (e.g., amount of time for the vehicle travel from the current position to the stop line or intersection). The TTC may be calculated based on the current distance to the junction, the speed of the vehicle, and/or the acceleration of the vehicle. The TTC may be compared with a predetermined time threshold. If the TTC is smaller than or equal to the predetermined time threshold, a system response may be triggered. The predetermined time threshold may be 1 second, 2 seconds, 3 seconds, 4 seconds, 5 seconds, or any other suitable time.

To trigger the system response based on the minimum deceleration condition, processing unit 110 may calculate, in each time frame, the minimum deceleration of the vehicle required for the vehicle to fully stop at the junction within the measured distance from the vehicle to the junction. The required minimum deceleration may be calculated based on the current distance Z from the vehicle to the junction and the current speed V of the vehicle as: $dec=V^2/2Z$ (m/sec$^2$).

Processing unit 110 may compare the required minimum deceleration with a predetermined deceleration threshold. If the required minimum deceleration is greater than or equal to the predetermined deceleration threshold, a system response may be triggered.

In some embodiments, the system response may be triggered when both TTC based condition and the minimum deceleration based condition are satisfied. For example, processing unit 110 may determine to cause a system response when the current TTC for the vehicle is smaller than or equal to the predetermined time threshold, and the required minimum deceleration is greater than or equal to the predetermined deceleration threshold.

In some embodiments, when one or both of the above conditions are satisfied and when the vehicle is approaching a red traffic light (or a yellow traffic light, or a green traffic light that is transitioning to yellow, which will soon transition to red), processing unit 110 may not cause a system response if one or more suppression schemes are satisfied. The suppression schemes may be implemented in suppression module 825. Suppression schemes may be based on vision information and/or based on driver behavior.

Suppression schemes based on vision information may include suppressing a system response when detected traffic lights are on the far left side or far right side. In such situations, the traffic lights are considered as regulating other roads. Suppression schemes based on vision information may also include suppressing a system response when there are some traffic lights in the junction that has conflict in their colors to the relevant traffic light for the vehicle. Suppression schemes based on vision information may also include suppressing a system response when only one traffic light is detected. Suppression schemes based on vision information may also include suppressing a system response when the junction of the detected traffic light is more than a predetermined distance away, such as 60 meters away, 80 meters away, or any other suitable distance away. Suppression schemes based on vision information may also include suppressing a system response when the distance to a preceding vehicle is less than a predetermined distance, such as 40 meters, 35 meters, 50 meters, or any other suitable distance. The term "preceding vehicle" refers to a vehicle that is driving in the same direction in front of the vehicle on which system 100 is provided (e.g., vehicle 200). A preceding vehicle may be detected by its tail lights.

Suppression schemes based on the driver behavior may include suppressing a system response (e.g., an alert or warning notification to the driver of a vehicle) when a signal from braking system 230 indicates that the driver has pressed the brakes. This may indicate that the driver has full control of the vehicle and is probably aware of the traffic lights ahead of the vehicle. Suppression schemes based on the driver behavior may also include suppressing a system response when a signal from a turn light (e.g., left turn light or right turn light) indicates that the driver has turned on the left or right turn light. This, when coupled with detection of an arrow in the traffic light (e.g., a left turn arrow or a right turn arrow), or a turn lane marking on the road surface in the images, may indicate that the driver is observing the traffic light. Suppression schemes based on the driver behavior may include suppressing a system response when a signal from steering system 240 indicates that the driver is making a sharp left or right turn.

Figure 12:
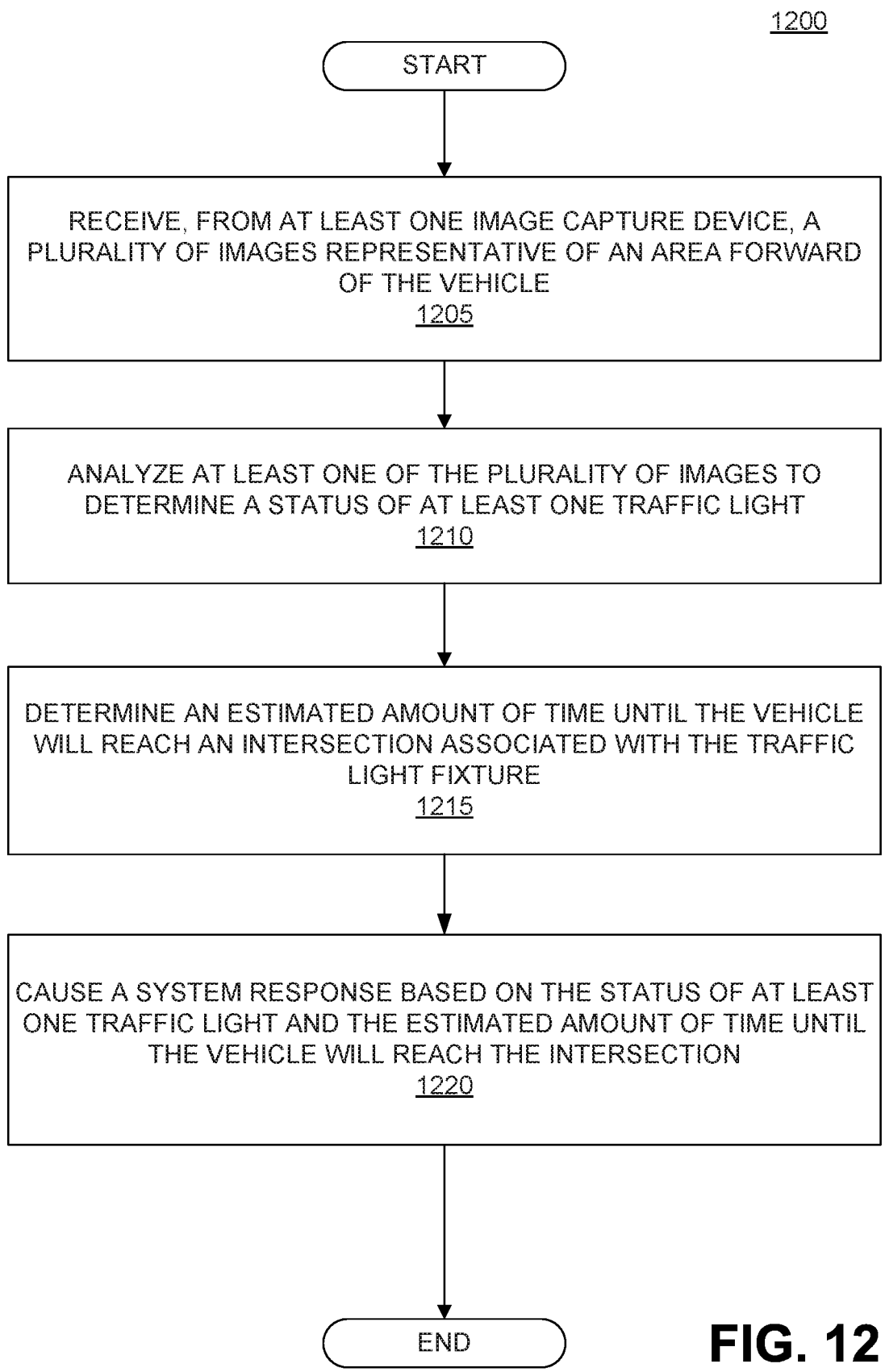
FIG. 12 is a flowchart illustrating a method of detecting a traffic light, consistent with the disclosed embodiments.

FIG. 12 is a flowchart illustrating a method of detecting a traffic light consistent with the disclosed embodiments. Method 1200 may be executed by processing unit 110. Method 1200 may include receiving, from at least one image capture device, a plurality of images representative of an area forward of the vehicle (step 1205). For example, processing unit 110 may receive at least one image (e.g., one or more images) captured by at least one of image capture devices 122-126. Method 1200 may also include analyzing at least one of the plurality of images to determine a status of the at least one traffic light (step 1210). For example, processing unit 110, via traffic light detection module 810, may detect one or more traffic lights in the captured images, and may further detect the status of a traffic light based on the captured images. The status may include a green light, a yellow light, a red light, a yellow and blinking light, etc. The status may also include a transition from green to yellow, or from yellow to red, or from red to green. The status may further include an arrow in a traffic light indicating a turn is allowed.

Method 1200 may also include determining an estimated amount of time until the vehicle will reach an intersection associated with the traffic light fixture (step 1215). The estimated amount of time may also be referred to as the time to contact (TTC). For example, processing unit 110, via time determination module 820, may determine the TTC from vehicle's current position to the intersection, e.g., to the stop line of the intersection, if the stop line is visible in the images, or to a starting location of the intersection where the stop line or a pedestrian line is supposed to be located.

Method 1200 may further include causing a system response based on the status of at least one traffic light and the estimated amount of time until the vehicle will reach the intersection (step 1220). For example, processing unit 110 may cause the system response when the traffic light is yellow or red, or when the traffic light is transitioning from yellow to red, or when the traffic light is transitioning from green to yellow. Processing unit 110 may cause the system response when the status of the traffic light is one of the above situations, and the TTC is smaller than or equal to a predetermined time threshold. For example, processing unit 110 may cause vehicle to brake such that the vehicle can fully stop before reaching the intersection (e.g., before reaching the stop line or the pedestrian crossing line at the starting location of the intersection).

Alternatively or additionally, processing unit 110 may cause an alert or warning notification to be displayed or sounded to the driver of the vehicle. As another example, when the traffic light is yellow and when the TTC is greater than the predetermined time threshold, processing unit 110 may determine that if the vehicle maintains the current speed, the vehicle may safely pass the intersection without causing an emergency braking. Thus, processing unit 110 may cause the vehicle (e.g., via throttling system 220) to maintain the current speed and pass the intersection at the current speed. Alternatively or additionally, processing unit 110 may determine that if the vehicle accelerates and continues driving with a greater speed (higher than the current speed), the vehicle will safely pass the intersection despite a current yellow light, processing unit 110 may cause the vehicle to accelerate to pass the intersection more quickly.

Method 1200 may include other steps. For example, processing unit 110 may determine whether the at least one traffic light is relevant to the vehicle. Processing unit 110 may suppress the system response when the at least one traffic light is determined to be not relevant to the vehicle. Processing unit 110 may analyze at least one of the plurality of images to identify a marking on a road in the area forward of the vehicle. Processing unit 110 may determine whether the at least one traffic light is relevant to the vehicle based on the marking on the road. The marking on the road may include a turn lane arrow, and the at least one processing device is further programmed to suppress the system response based on detecting the turn lane arrow.

In some embodiments, processing unit 110 may determine the amount of time until the vehicle will reach the intersection based on a distance of the vehicle to a stop line associated with the traffic light fixture. The distance of the vehicle to the stop line may be determined based on analysis of at least two of the plurality of images including the stop line. Processing unit 110 may determine the amount of time until the vehicle will reach the intersection based on a distance of the vehicle to the traffic light fixture. The distance of the vehicle to the traffic light fixture may be determined based on analysis of at least two of the plurality of images including the traffic light fixture. Processing unit 110 may suppress the system response when a signal from a steering system of the vehicle indicates that the vehicle turns left or right. The system response may include applying vehicle brakes. Processing unit 110 may provide a visual or auditory notice to a driver of the vehicle prior to causing the system response.

In some embodiments, processing unit 110 may cause the system response when the status of the at least one traffic light is represented by a yellow or red color, and when a minimum deceleration needed for the vehicle to travel a distance from a current position of the vehicle to the intersection to achieve a full stop before reaching the intersection is equal to or greater than a predetermined deceleration threshold. Processing unit 110 may determine the minimum deceleration based on a current speed of the vehicle and the distance from the current position of the vehicle to the intersection.

In some embodiments, processing unit 110 may cause the system response when the status of the at least one traffic light is represented by a yellow or red color, and when the estimated amount of time for the vehicle to travel a distance from a current position of the vehicle to the intersection to achieve a full stop before reaching the intersection is equal to or greater than a predetermined deceleration threshold.

In some embodiments, processing unit 110 may cause the system response when the status of at least one traffic light is represented by a yellow or red color, when the estimated amount of time until the vehicle will reach the intersection is equal to or less than a predetermined time threshold, and when one or more predetermined suppression schemes are not satisfied.

In some embodiments, processing unit 110 may cause the system response when the status of the at least one traffic light is represented by a yellow or red color, when a minimum deceleration needed for the vehicle to travel a distance from a current position of the vehicle to the intersection to achieve a full stop before reaching the intersection is equal to or greater than a predetermined deceleration threshold, and when one or more predetermined suppression schemes are not satisfied.

In some embodiments, the one or more predetermined suppression schemes may include suppressing the system response when at least one of the following is satisfied: the at least one traffic light is on a left or right side of the field of view at a distance to a center of the field of view that is greater than a predetermined distance, or the traffic light fixture including the at least one traffic light is more than a predetermined distance away from the vehicle, or a distance from the vehicle to a preceding vehicle is less than a predetermined distance.

In some embodiments, the one or more predetermined suppression schemes may include suppressing the system response when at least one of the following is satisfied: a signal from a braking system of the vehicle indicates that the driver has applied a brake, or a signal from a lighting system of the vehicle indicates that a left or right turn signal is blinking and the status of the at least one traffic light is represented by a green color with an arrow indication, or a signal from a steering system indicates that the vehicle is making a sharp turn.

Figure 13:
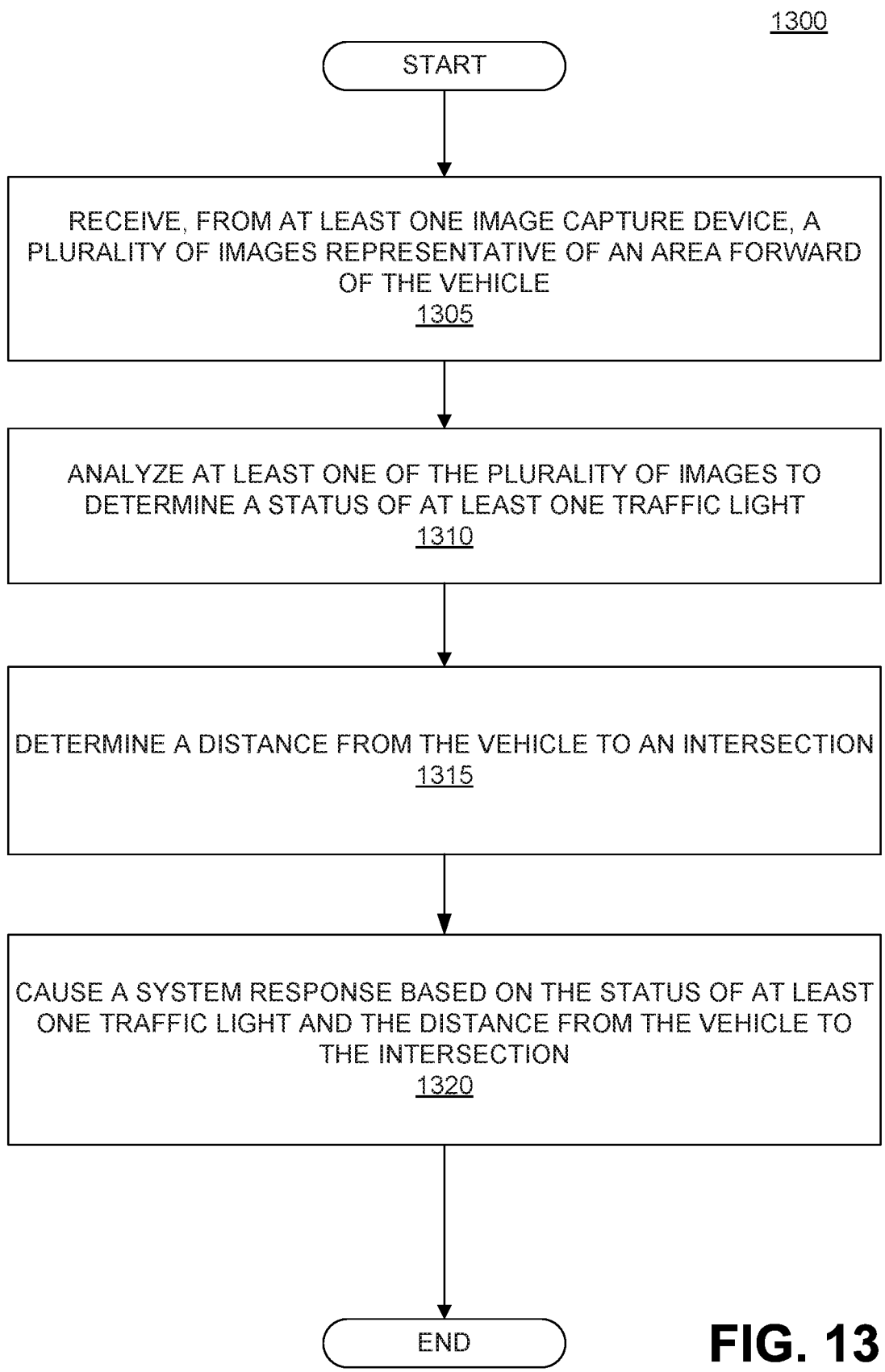
FIG. 13 is a flowchart illustrating another method of detecting a traffic light, consistent with the disclosed embodiments.

FIG. 13 is a flowchart illustrating another method of detecting a traffic light, consistent with another embodiment of the present disclosure. Method 1300 may include receiving, from at least one image capture device, a plurality of images representative of an area forward of the vehicle (step 1305). Step 1305 may be similar to step 1205. Thus, the discussion of step 1205 is also applicable to step 1305. Method 1300 may also include analyzing at least one of the plurality of images to determine a status of the at least one traffic light (step 1310). Step 1310 may be similar to step 1210. Thus, the discussion of step 1210 is also applicable to step 1310.

Method 1300 may also include determining a distance from the vehicle to an intersection (step 1315). The distance from the vehicle to the intersection may be determined based on at least one of a distance to a stop line or a pedestrian line at the starting location of the intersection as detected in the captured images, and a distance from the vehicle to at least one of the traffic light detected in the captured images. In one embodiment, the distance to the intersection from the vehicle may be treated as the distance to the stop line captured in the images, and may be determined based on the analysis of the captured images including the stop line. In one embodiment, the distance to the intersection from the vehicle may be the distance to a starting location where the stop line is supposed to be located, and the distance to the intersection may be determined based on one or more distances from the vehicle to one or more traffic lights detected in the images. In some embodiments, a default length of junction may be used in the calculation of the distance to the intersection.

Method 1300 may further include causing a system response based on the status of at least one traffic light and the distance from the vehicle to the intersection (step 1320). For example, processing unit 110 may cause a system response, such as an alert to the driver, or braking of the vehicle, when the traffic light is yellow or red, and the distance to the intersection is smaller than or equal to a predetermined distance, such that a time to contact (TTC) from the current position of the vehicle to the intersection is smaller than or equal to a predetermined time threshold.

As another example, processing unit 110 may calculate a minimum deceleration required for the vehicle to achieve a full stop before reaching the starting location (e.g., the stop line) of the intersection. Processing unit 110 may cause a system response such as braking of the vehicle when the minimum deceleration required is greater than or equal to a predetermined deceleration threshold. For example, when the minimum deceleration calculated based on the distance to the intersection and the current speed of the vehicle is greater than 10 m/s² (an absolute value of the deceleration), where unit m/s² is meter/second/second, processing unit 110 may determine that the minimum deceleration is too large and the driver or the vehicle must brake now in order to safely stop at the stop line (or the starting location of the intersection). Thus, processing unit 110 may cause the vehicle or the driver to brake.

Method 1300 may include other steps. For example, processing unit 110 may determine an amount of time until the vehicle will reach an intersection associated with the traffic light fixture based on the distance and a current speed of the vehicle, compare the amount of time to a predetermine time threshold, and trigger the system response when the amount of time is smaller than or equal to the predetermined time threshold.

In some embodiments, processing unit 110 may determine an amount of time until the vehicle will reach an intersection associated with the traffic light fixture based on the distance and a current speed of the vehicle, compare the amount of time to a predetermine time threshold, determine whether a predetermined suppression scheme is satisfied, and trigger the system response when the amount of time is smaller than or equal to the predetermined time threshold and when the predetermined suppression scheme is not satisfied.

In some embodiments, processing unit 110 may determine, based on the distance from the vehicle to the intersection, a minimum deceleration required for vehicle to stop before the intersection within the distance from the vehicle to the intersection, compare the minimum deceleration required with a predetermined deceleration threshold, and trigger the system response when the minimum deceleration required is greater than or equal to the predetermined deceleration threshold.

In some embodiments, processing unit 110 may determine, based on the distance from the vehicle to the intersection, a minimum deceleration required for vehicle to stop before the intersection within the distance from the vehicle to the intersection, compare the minimum deceleration required with a predetermined deceleration threshold, determine whether a predetermined suppression scheme is satisfied, and trigger the system response when the minimum deceleration required is greater than or equal to the predetermined deceleration threshold and when the predetermined suppression scheme is not satisfied.

In some embodiments, processing unit 110 may determine an amount of time until the vehicle will reach an intersection associated with the traffic light fixture based on the distance and a current speed of the vehicle, compare the amount of time to a predetermine time threshold, determine, based on the distance from the vehicle to the intersection, a minimum deceleration required for vehicle to stop before the intersection within the distance from the vehicle to the intersection, compare the minimum deceleration required with a predetermined deceleration threshold, and trigger the system response when the amount of time is smaller than or equal to the predetermined time threshold and when the minimum deceleration required is greater than or equal to the predetermined deceleration threshold.

In some embodiments, processing unit 110 may determine an amount of time until the vehicle will reach an intersection associated with the traffic light fixture based on the distance and a current speed of the vehicle, compare the amount of time to a predetermine time threshold, determine, based on the distance from the vehicle to the intersection, a minimum deceleration required for vehicle to stop before the intersection within the distance from the vehicle to the intersection, compare the minimum deceleration required with a predetermined deceleration threshold, determine whether a predetermined suppression scheme is satisfied, and trigger the system response when the amount of time is smaller than or equal to the predetermined time threshold, when the minimum deceleration required is greater than or equal to the predetermined deceleration threshold, and when the predetermined suppression scheme is not satisfied.

Examples of the present disclosure relate to a traffic light, detection thereof and navigational responses based on a state of the traffic light. However, it would be appreciated that examples of the presently disclosed subject matter can be applied to any visually detectable (e.g., by a camera mounted onboard a vehicle) traffic control object, whose state changes dynamically, and a visual appearance of the control object respectively changes to indicate the change in the state of the object. By way of example, the change can involve a change in a color of the object, the part of the object which emits light, the shape that is displayed by the object, etc. In another example, the visual appearance can also indicate the relevance of the control object. For example, if an arrow appears on the object, it may be intended for vehicles that navigate in the direction indicated by the arrow. As another example, several control objects can be adjacent to one another, and the location of a control object, in particular relative to one or more other control objects (typically similar to that control object) can indicate its relevance (or irrelevance) to a vehicle that is navigating to a certain destination (or in a certain direction).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A traffic light detection system for installation in a vehicle, the system comprising:
    a processing unit comprising a central processing unit (CPU) and support circuitry, the processing unit programmed to:
        access images representative of an area in a direction of travel of the vehicle, the images captured by an image acquisition unit, the area including a plurality of candidate traffic light fixtures;
        analyze the images to identify the plurality of candidate traffic light fixtures;
        select a traffic light fixture from the plurality of candidate traffic light fixtures based on a position of the vehicle and whether the traffic light fixture is relevant to a lane of travel of the vehicle, wherein whether the traffic light fixture is relevant to a lane of travel of the vehicle is determined from:
            a score of each of the plurality of candidate traffic lights,
            a position, relative to the vehicle, of each of the plurality of candidate traffic lights, and
            a shape of each of the plurality of candidate traffic lights;
        determine a status of the selected traffic light fixture; and
        cause a navigational response of the vehicle based on the status of the selected traffic light fixture and a distance from the vehicle to an intersection controlled by the selected traffic light fixture.

2. The system of claim 1, wherein the navigational response comprises at least one of: a turn, a lane shift, a change in acceleration, a change in velocity, or braking.

3. The system of claim 1, wherein the processing unit is further programmed to cause the navigational response when the status of the traffic light fixture is represented by a yellow or red color.

4. The system of claim 1, wherein the processing unit is further programmed to cause the navigational response when an estimated amount of time until the vehicle will reach the intersection is equal to or less than a predetermined time threshold.

5. The system of claim 1, wherein the processing unit is further programmed to cause the navigational response when the status of the traffic light fixture is represented by a yellow or red color, and an estimated amount of time until the vehicle will reach the intersection is equal to or less than a predetermined time threshold.

6. The system of claim 1, wherein the processing unit is further programmed to analyze at least one of the images to identify a marking on a road in the area forward of the vehicle.

7. A method for traffic light detection, the method comprising:
    accessing images representative of an area in a direction of travel of a vehicle, the images captured by an image acquisition unit, the area including a plurality of candidate traffic light fixtures;
    analyzing the images to identify the plurality of candidate traffic light fixtures;
    selecting a traffic light fixture from the plurality of candidate traffic light fixtures based on a position of the vehicle and whether the traffic light fixture is relevant to a lane of travel of the vehicle, wherein whether the traffic light fixture is relevant to a lane of travel of the vehicle is determined from:
        a score of each of the plurality of candidate traffic lights,
        a position, relative to the vehicle, of each of the plurality of candidate traffic lights, and a shape of each of the plurality of candidate traffic lights;

determining a status of the selected traffic light fixture; and causing a navigational response of the vehicle based on the status of the selected traffic light fixture and a distance from the vehicle to an intersection controlled by the selected traffic light fixture.

8. The method of claim 7, wherein the navigational response comprises at least one of: a turn, a lane shift, a change in acceleration, a change in velocity, or braking.

9. The method of claim 7, further comprising causing the navigational response when the status of the traffic light fixture is represented by a yellow or red color.

10. The method of claim 7, further comprising causing the navigational response when an estimated amount of time until the vehicle will reach the intersection is equal to or less than a predetermined time threshold.

11. The method of claim 7, further comprising causing the navigational response when the status of the traffic light fixture is represented by a yellow or red color, and an estimated amount of time until the vehicle will reach the intersection is equal to or less than a predetermined time threshold.

12. The method of claim 7, further comprising analyzing at least one of the images to identify a marking on a road in the area forward of the vehicle.

13. A non-transitory computer readable medium comprising executable instructions that when executed by at least one processing device cause the at least one processing device to detect a traffic light and perform operations comprising:

accessing images representative of an area in a direction of travel of a vehicle, the images captured by an image acquisition unit, the area including a plurality of candidate traffic light fixtures;

analyzing the images to identify the plurality of candidate traffic light fixtures;

selecting a traffic light fixture from the plurality of candidate traffic light fixtures based on a position of the vehicle and whether the traffic light fixture is relevant to a lane of travel of the vehicle, wherein whether the traffic light fixture is relevant to a lane of travel of the vehicle is determined from:

a score of each of the plurality of candidate traffic lights, a position, relative to the vehicle, of each of the plurality of candidate traffic lights, and a shape of each of the plurality of candidate traffic lights;

determining a status of the selected traffic light fixture; and causing a navigational response of the vehicle based on the status of the selected traffic light fixture and a distance from the vehicle to an intersection controlled by the selected traffic light fixture.

14. The non-transitory computer readable medium of claim 13, wherein the navigational response comprises at least one of: a turn, a lane shift, a change in acceleration, a change in velocity, or braking.

15. The non-transitory computer readable medium of claim 13, further comprising causing the navigational response when the status of the traffic light fixture is represented by a yellow or red color.

16. The non-transitory computer readable medium of claim 13, further comprising causing the navigational response when an estimated amount of time until the vehicle will reach the intersection is equal to or less than a predetermined time threshold.

17. The non-transitory computer readable medium of claim 13, further comprising causing the navigational response when the status of the traffic light fixture is represented by a yellow or red color, and an estimated amount of time until the vehicle will reach the intersection is equal to or less than a predetermined time threshold.

18. The system of claim 1, wherein to select the traffic light fixture from the plurality of candidate traffic light fixtures based on the position of the vehicle and whether the traffic light fixture is relevant to the vehicle, the processing unit is to:

assign a first score to the traffic light fixture; and determine first score assigned to the traffic light fixture reflects a greater degree of relevancy than a second score assigned to a second traffic light fixture of the plurality of candidate traffic light fixtures.

19. The method of claim 7, wherein selecting the traffic light fixture from the plurality of candidate traffic light fixtures based on the position of the vehicle and whether the traffic light fixture is relevant to the vehicle, comprises:

assigning a first score to the traffic light fixture; and determining the first score assigned to the traffic light fixture reflects a greater degree of relevancy than a second score assigned to a second traffic light fixture of the plurality of candidate traffic light fixtures.

20. The non-transitory computer readable medium of claim 13, wherein selecting the traffic light fixture from the plurality of candidate traffic light fixtures based on the position of the vehicle and whether the traffic light fixture is relevant to the vehicle, comprises:

assigning a first score to the traffic light fixture; and determining the first score assigned to the traffic light fixture reflects a greater degree of relevancy than a second score assigned to a second traffic light fixture of the plurality of candidate traffic light fixtures.

* * * * *